(12) United States Patent
Saito et al.

(10) Patent No.: US 10,887,148 B2
(45) Date of Patent: Jan. 5, 2021

(54) USER TERMINAL AND WIRELESS COMMUNICATION METHOD

(71) Applicant: NTT DOCOMO, INC., Tokyo (JP)

(72) Inventors: Keisuke Saito, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/324,146

(22) PCT Filed: Aug. 2, 2017

(86) PCT No.: PCT/JP2017/028123
§ 371 (c)(1),
(2) Date: Feb. 8, 2019

(87) PCT Pub. No.: WO2018/030243
PCT Pub. Date: Feb. 15, 2018

(65) Prior Publication Data
US 2019/0165986 A1 May 30, 2019

(30) Foreign Application Priority Data
Aug. 10, 2016 (JP) .................................. 2016-157948

(51) Int. Cl.
*H04L 27/26* (2006.01)
*H04L 25/02* (2006.01)
(Continued)

(52) U.S. Cl.
CPC ....... *H04L 27/2695* (2013.01); *H04B 7/0452* (2013.01); *H04L 25/023* (2013.01);
(Continued)

(58) Field of Classification Search
CPC ....... H04L 5/00; H04L 5/0007; H04L 5/0048; H04L 5/0051; H04L 5/10; H04L 25/02;
(Continued)

(56) References Cited

U.S. PATENT DOCUMENTS 8,737,364 B2 * 5/2014 Suzuki .................... H04L 5/001
370/336
9,380,570 B2 * 6/2016 Takeda ..................... H04L 1/00
(Continued)

FOREIGN PATENT DOCUMENTS

| EP | 1898542 A1 | 3/2008 |
|---|---|---|
| EP | 2978272 A1 | 1/2016 |
| JP | 2007-089113 A | 4/2007 |

OTHER PUBLICATIONS

International Search Report issued in PCT/JP2017/028123 dated Oct. 24, 2017 (5 pages).
(Continued)

*Primary Examiner* — Tri H Phan
(74) *Attorney, Agent, or Firm* — Osha Bergman Watanabe & Burton LLP

(57) ABSTRACT

A user terminal according to the present invention calculates a channel estimation value for each subcarrier by using a demodulation RS, calculates the time fluctuation amount of each symbol by using a correction RS mapped on a symbol following a symbol on which the modulation RS is mapped, corrects the channel estimation value for the subcarrier of a resource element on which a data signal to be demodulated is mapped, by using the time fluctuation amount of the symbol of the resource element, and calculates the channel estimation value of the resource element.

7 Claims, 30 Drawing Sheets

(51) Int. Cl.
  *H04W 72/04* (2009.01)
  *H04B 7/0452* (2017.01)
(52) U.S. Cl.
  CPC .......... *H04L 25/0204* (2013.01); *H04L 27/26* (2013.01); *H04W 72/04* (2013.01); *H04W 72/0453* (2013.01)
(58) Field of Classification Search
  CPC ............. H04L 25/0202; H04L 25/0204; H04L 25/023; H04L 27/26; H04L 27/2611; H04L 27/2613; H04L 27/2621; H04L 27/2628; H04L 27/2666; H04L 27/2695; H04L 7/0016; H04L 2012/563; H04L 2012/5631; H04L 2012/03783; H04L 25/0224; H04L 27/32; H04L 27/261; H04L 27/2601; H04L 49/55; H04W 28/06; H04W 72/04; H04W 72/042; H04W 72/0446; H04W 72/048; H04W 72/0453; H04W 88/02; H04B 7/0413; H04B 7/0452; H04B 7/06; H04B 2201/71636
  See application file for complete search history.

(56) References Cited

U.S. PATENT DOCUMENTS

| | | | |
|---|---|---|---|
| 9,698,892 B2* | 7/2017 | Horiuchi | H04B 7/068 |
| 9,935,753 B2* | 4/2018 | Kim | H04J 11/0056 |
| 10,411,777 B2* | 9/2019 | Islam | H04B 7/0617 |
| 10,530,432 B2* | 1/2020 | Mizusawa | H04B 7/0469 |
| 2013/0064196 A1 | 3/2013 | Gao et al. | |
| 2016/0028521 A1* | 1/2016 | Shimezawa | H04J 11/005 370/329 |
| 2018/0034531 A1* | 2/2018 | Sadiq | H04W 72/046 |
| 2019/0349240 A1* | 11/2019 | Saito | H04L 27/26 |

OTHER PUBLICATIONS

Written Opinion of the International Searching Authority issued in PCT/JP2017/028123 dated Oct. 24, 2017 (4 pages).

Qualcomm, Ericsson, Panasonic, NTT Docomo, ZTE, Convida, Nokia, ASB, Sony, Intel; "Way Forward on Frame Structure"; 3GPP TSG RAN WG1 #85, R1-165575; Nanjing, China; May 23-27, 2016 (2 pages).

3GPP TS 36.300 V13.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Jun. 2016 (310 pages).

Extended European Search Report issued in the counterpart European Patent Application No. 17839314.6, dated Feb. 25, 2020 (8 pages).

Sun, S. et al.; "Support for Vehicle-to-Everything Services Based on LTE"; IEEE Wireless Communications; Jun. 2016 (5 pages).

* cited by examiner

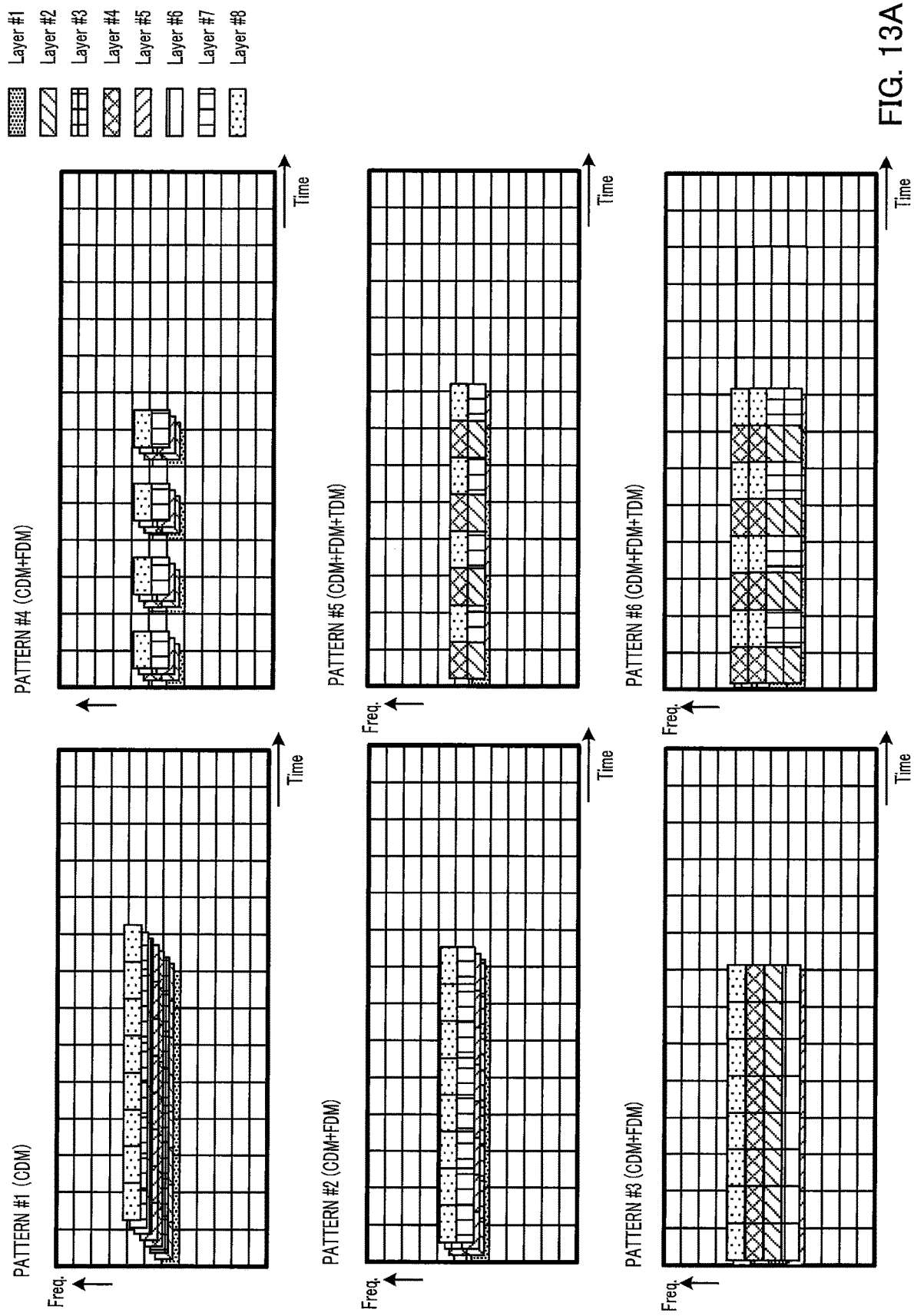

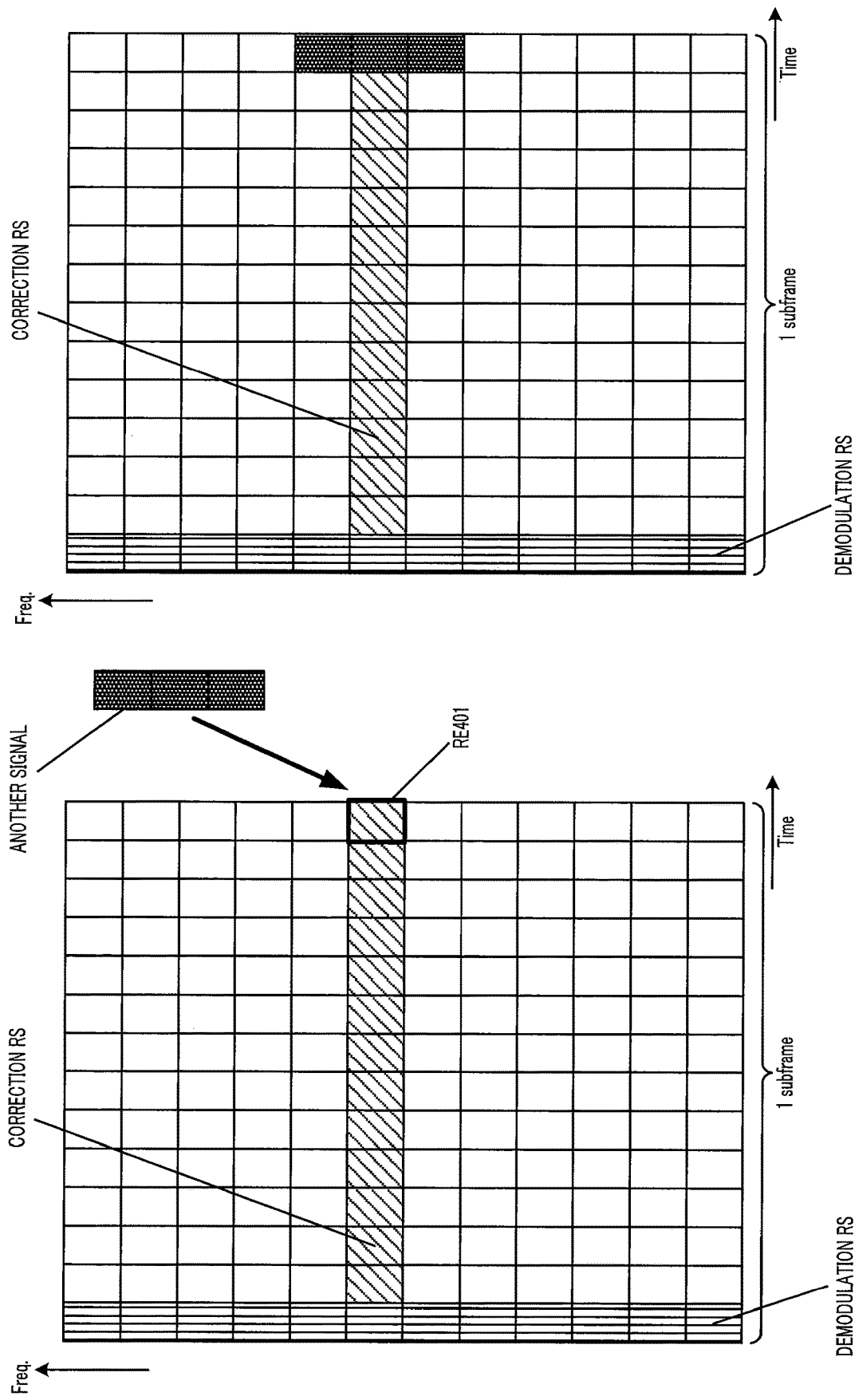

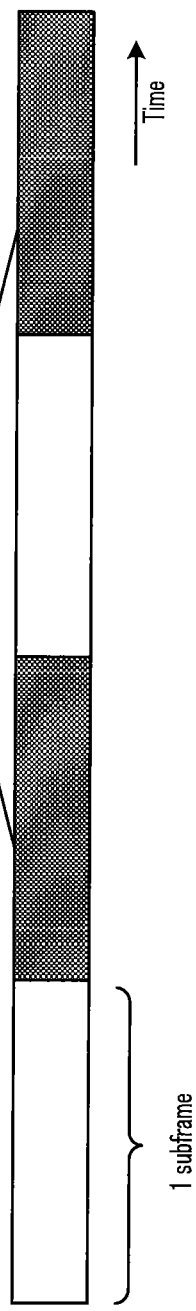
FIG. 22
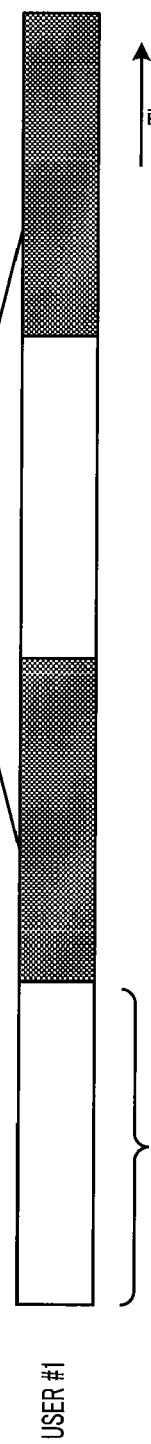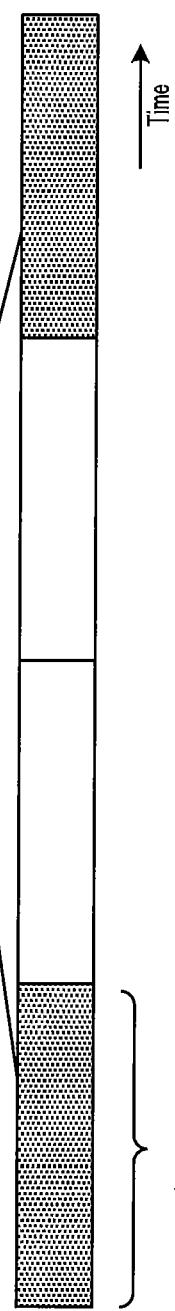
FIG. 23

USER TERMINAL AND WIRELESS COMMUNICATION METHOD

TECHNICAL FIELD

The present invention relates to a user terminal and a radio communication method in a next generation mobile communication system.

BACKGROUND ART

Long Term Evolution (LTE) has been specified for achieving a higher data rate, lower latency, and/or the like in a Universal Mobile Telecommunications System (UMTS) network (NPL 1). Future systems of LTE (for example, the systems called LTE-A (LTE-Advanced), FRA (Future Radio Access), 5G (5th generation mobile communication system), 5G+ (5G plus), and New-RAT (Radio Access Technology)) have been also studied for achieving a broader bandwidth and a higher speed based on LTE.

For a future radio communication system (for example, 5G), use of a wideband frequency spectrum has been studied to meet demands such as ultrahigh speed, large capacity, and ultralow latency. Therefore, for a future radio communication system, use of a higher frequency band (for example, a band of 30 to 70 GHz) than a frequency band used in an existing LTE system and use of massive multiple input multiple output (MIMO) using multiple antenna elements have been studied.

Also, for a future radio communication system, mapping a demodulation reference signal (for example, a demodulation reference signal (DMRS); hereinafter, may be referred to as "demodulation RS") to a front side of a subframe to achieve reduction of processing time required for channel estimation and signal demodulation in a subframe has been studied (NPL 2).

CITATION LIST

Non-Patent Literature

NPL 1
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016
NPL 2
R1-165575, Qualcomm, Ericsson, Panasonic, NTT Docomo, ZTE, Convida, Nokia, ASB, Sony, Intel, "Way Forward On Frame Structure," May 2016

SUMMARY OF INVENTION

Technical Problem

However, where a demodulation RS is mapped on the front side of a subframe, if demodulation is performed simply using a channel estimation value based on the demodulation RS, the demodulation fails to follow temporal fluctuation of the channel, the channel estimation accuracy deteriorates further on the rear side of the subframe, and the communication quality thus decreases. This problem becomes particularly prominent when a user terminal is moving at high speed.

An aspect of the present invention is to provide a user terminal and a radio communication method that where a demodulation RS is mapped on the front side of a subframe, prevent deterioration in channel estimation accuracy on the rear side of the subframe and thereby prevent decrease in communication quality.

Solution to Problem

A user terminal according to an aspect of the present invention includes: a receiver that receives a downlink signal including a data signal, a demodulation reference signal, and a correction reference signal; a channel estimator that calculates a channel estimation value of each subcarrier, using the demodulation reference signal; a channel corrector that calculates a temporal fluctuation amount of each symbol, using the correction reference signal; and a demodulator that demodulates the data signal, using the channel estimation value and the temporal fluctuation amount.

Advantageous Effects of Invention

An aspect of the present invention enables, where a demodulation RS is mapped on the front side of a subframe, preventing deterioration in channel estimation accuracy on the rear side of the subframe and thereby preventing decrease in communication quality.

BRIEF DESCRIPTION OF DRAWINGS

FIG. 13A is a diagram illustrating fifth example mapping according to variation 2 of an embodiment of the present invention;

FIG. 15A is a diagram illustrating seventh example mapping according to variation 2 of an embodiment of the present invention;

FIG. 15B is a diagram illustrating seventh example mapping according to variation 2 of an embodiment of the present invention;

FIG. 22 is a diagram illustrating first example mapping according to variation 4 of an embodiment of the present invention;

FIG. 23 is a diagram illustrating second example mapping according to variation 4 of an embodiment of the present invention;

DESCRIPTION OF EMBODIMENTS

Background to Present Invention

Since in the DMRS mapping method in existing LTE systems, a DMRS is mapped in a dispersed manner in a subframe, and thus that method is unsuitable as a method for achieving low latency (that is, reduction in processing time) demanded for future radio communication systems. Therefore, for future radio communication systems, mapping a demodulation RS to the front side of a subframe has been studied.

However, where a demodulation RS is mapped on the front side of a subframe, if demodulation is performed simply using a channel estimation value based on the demodulation RS, the demodulation RS fails to temporal fluctuation of the channel, resulting in the problem of deterioration in channel estimation accuracy on the rear side of the subframe.

In order to solve the above problem, the present inventors have conceived of mapping (disposing) a RS that is different from a demodulation RS and consequently made the present invention.

The present invention is characterized mainly in mapping a time fluctuation correction reference signal (hereinafter referred to as "correction RS (refinement RS)") on a symbol behind a symbol on which a demodulation RS is mapped and correcting a channel estimation value calculated using the demodulation RS, based on a temporal fluctuation amount calculated using the correction RS.

An embodiment of the present invention will be described in detail below with reference to the accompanying drawings.

Embodiment

Figure 1:
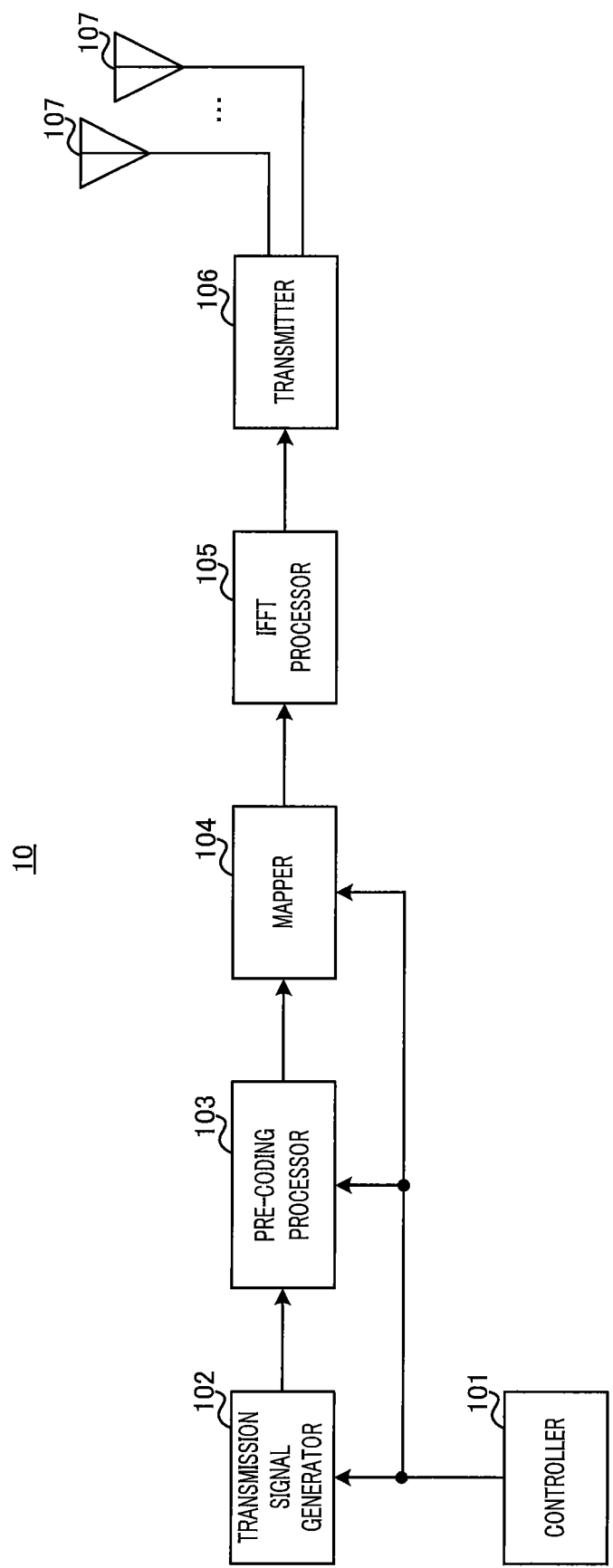
FIG. 1 is a block diagram illustrating an example configuration of a radio base station according to an embodiment of the present invention.
Figure 2:
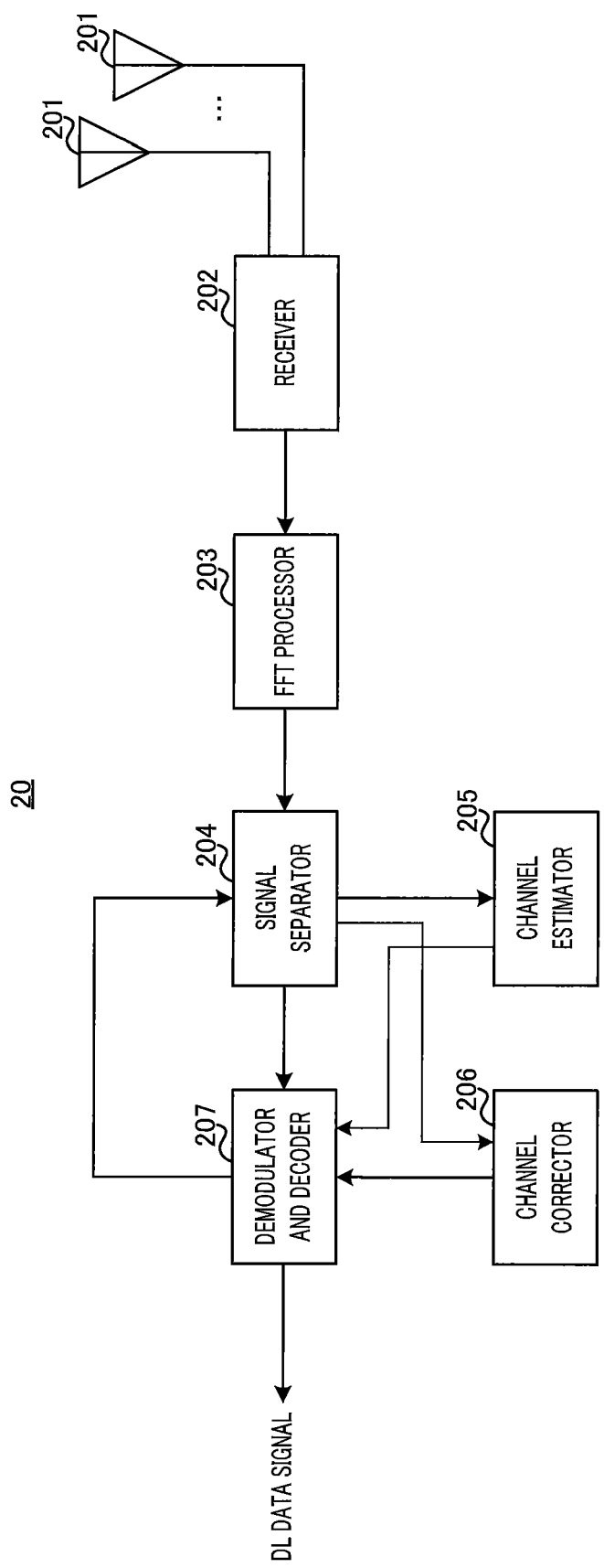
FIG. 2 is a block diagram illustrating an example configuration of a user terminal according to an embodiment of the present invention.

A radio communication system according to the present embodiment at least includes radio base station 10 illustrated in FIG. 1 and user terminal 20 illustrated in FIG. 2. User terminal 20 is connected to radio base station 10. Radio base station 10 transmits a DL control signal to user terminal 20 using a downlink control channel (for example, PDCCH) and transmits a DL data signal, a demodulation RS, and a correction RS using a downlink data channel (for example, a downlink shared channel (PDSCH)).

<Radio Base Station>

FIG. 1 is a diagram illustrating an example of an overall configuration of a radio base station according to the present embodiment. Radio base station 10 illustrated in FIG. 1 has a configuration including controller 101, transmission signal generator 102, precoding processor 103, mapper 104, IFFT (inverse fast Fourier transform) processor 105, transmitter 106, and antenna 107.

Controller 101 (scheduler) performs scheduling (for example, resource assignment) for, for example, a DL data signal, a DL control signal, a demodulation RS, and a correction RS. In the present embodiment, controller 101 performs scheduling so that a demodulation RS is mapped to a top symbol of each subframe and a correction RS is mapped to a predetermined symbol other than the top symbol on a predetermined subcarrier of each subframe.

Information indicating a resource to which, for example, the demodulation RS and the correction RS are mapped (mapping configuration) may be indicated to user terminal 20, for example, by means of higher layer (for example, radio resource control (RRC) or medium access control (MAC)) signaling or may be provided to user terminal 20 by means of physical layer (PHY) signaling.

Alternatively, a mapping configuration and at least one of other parameters (for example, pieces of information relating to a system bandwidth, a carrier frequency and a DL data signal (for example, a mapping pattern)) may uniquely be associated with each other. In this case, user terminal 20 can implicitly identify the mapping configuration based on the other parameter, enabling reduction of signaling for indicating the mapping configuration.

Also, a parameter indicated as a mapping configuration may be, for example, a mapping pattern indicating positions at which the demodulation RS and the correction RS are mapped or any of, for example, a transmission cycle of each signal, a number of signals, a sequence to be used, and a number of antenna ports to be used. Also, the indicated value may be a set value itself or may be an index value provided for each of a plurality of set value candidates or an index value provided collectively for a plurality of set value candidates. Use of an index value enables reduction in size of signaling necessary for indicating a mapping configuration relative to the case where a set value itself is indicated.

Controller 101 outputs scheduling information indicating a result of the scheduling to transmission signal generator 102 and mapper 104.

Also, controller 101 controls precoding of, for example, the DL data signal, the DL control signal, the demodulation RS, and the correction RS. For example, controller 101 determines whether or not precoding is applied for these signals and a parameter to be used when precoding is applied (for example, a precoding vector (may be also referred to as, for example, "precoding weight" or "weight coefficients") or an antenna port (port number) and/or the like). Controller 101 outputs precoding information indicating the determined parameter to transmission signal generator 102 and precoding processor 103.

Transmission signal generator 102 generates a DL signal (including the DL data signal, the DL control signal, the demodulation RS, and the correction RS). For example, the DL control signal includes downlink control information (DCI) including the scheduling information and the precoding information output from controller 101. Also, transmission signal generator 102 performs coding processing and modulation processing on the DL signal. Transmission signal generator 102 outputs the generated DL signal to precoding processor 103.

Precoding processor 103 performs precoding of the DL signal input from transmission signal generator 102 based on the precoding information input from controller 101. Note that if no precoding of the DL control signal is performed, precoding processor 103 outputs the DL control signal to mapper 104 without processing.

Mapper 104 maps the DL signal input from precoding processor 103 to a predetermined radio resource based on the scheduling information input from controller 101. Mapper 104 outputs the DL signal mapped to the radio resource to IFFT processor 105. Note that details of a method of mapping (disposition) of the demodulation RS and the correction RS will be described later.

IFFT processor 105 performs IFFT processing on the DL signal, which is a frequency domain signal, input from mapper 104 and outputs the resulting DL signal, which is a time domain signal (that is, a signal including OFDM symbols) to transmitter 106. Note that in FIGS. 1 and 2, a signal waveform based on OFDM modulation is used as an example of a signal waveform of a DL signal but the signal waveform is not limited to this example and may be a signal waveform based on another scheme (for example, single carrier-frequency division multiple access (SC-FDMA)).

Transmitter 106 performs transmission processing such as up-conversion and amplification on the baseband DL signal input from IFFT processor 105 and transmits the resulting radio-frequency signal (DL signal) from antenna 107.

<User Terminal>

FIG. 2 is a diagram illustrating an example of an overall configuration of a user terminal according to the present embodiment. User terminal 20 illustrated in FIG. 2 has a configuration including antenna 201, receiver 202, fast Fourier transform (FFT) processor 203, signal separator 204, channel estimator 205, channel corrector 206, and demodulator and decoder 207.

Receiver 202 performs reception processing such as amplification and down-conversion on a radio-frequency signal (DL signal) received via antenna 201 and outputs the baseband DL signal to FFT processor 203.

FFT processor 203 performs FFT processing on the DL signal, which is a time domain signal, input from receiver 202 and outputs the resulting DL signal, which is a frequency domain signal, to signal separator 204.

Signal separator 204 demaps the DL control signal, the demodulation RS, and the correction RS from the DL signal input from FFT processor 203 based on the mapping configuration and outputs the demodulation RS to channel estimator 205, outputs the correction RS to channel corrector 206, and outputs the DL control signal to demodulator and decoder 207.

Also, signal separator 204 demaps the DL data signal from the DL signal based on the scheduling information (for example, the resource assignment) input from demodulator and decoder 207 and outputs the DL data signal to demodulator and decoder 207.

Channel estimator 205 performs channel estimation using the demodulation RS input from signal separator 204 and outputs a channel estimation value, which is a result of the estimation, to demodulator and decoder 207.

Channel corrector 206 performs channel estimation using the correction RS input from signal separator 204, and calculates differences between channel estimation values of the respective symbols to calculate a temporal fluctuation amount of each symbol. Note that if there is at least one match between antenna port numbers for the demodulation RS and antenna port numbers for the correction RS, channel corrector 206 may receive an input of the channel estimation value from channel estimator 205 and use the channel estimation value for temporal fluctuation amount calculation. Channel corrector 206 outputs the temporal fluctuation amounts to demodulator and decoder 207.

Demodulator and decoder 207 demodulates the DL data signal input from signal separator 204 using the channel estimation value input from channel estimator 205 and the temporal fluctuation amounts input from channel corrector 206. More specifically, demodulator and decoder 207 corrects channel estimation values of subcarriers in resource elements (REs) to which the DL data signal to be demodulated is mapped, using temporal fluctuation amounts of the symbols of the relevant REs, multiplies the signal to be modulated by the reciprocals of the corrected channel estimation values to perform channel compensation (equalization processing), and demodulates the DL data signal subjected to the channel compensation. Note that an RE is a radio resource area defined by one symbol and one subcarrier.

Also, demodulator and decoder 207 demodulates the DL control signal input from signal separator 204. Note that in order to shorten delay time, demodulation of the DL control signal may be performed using the channel estimation value alone without using the temporal fluctuation amounts.

Also, demodulator and decoder 207 performs decoding processing (for example, blind detection processing) on the demodulated DL control signal and the demodulated DL data signal. Reception data obtained as a result of the decoding of the DL data signal is transferred to an application section (not illustrated). Note that the application section performs, for example, processing relating to a layer that is a higher than the physical layer or the MAC layer. Also, control information such as the scheduling information obtained as a result of the decoding of the DL control signal is output to signal separator 204.

<Example Mapping of Demodulation RS and Correction RS>

Next, a mapping configuration for the demodulation RS and the correction RS will be described in detail.

Figure 3:
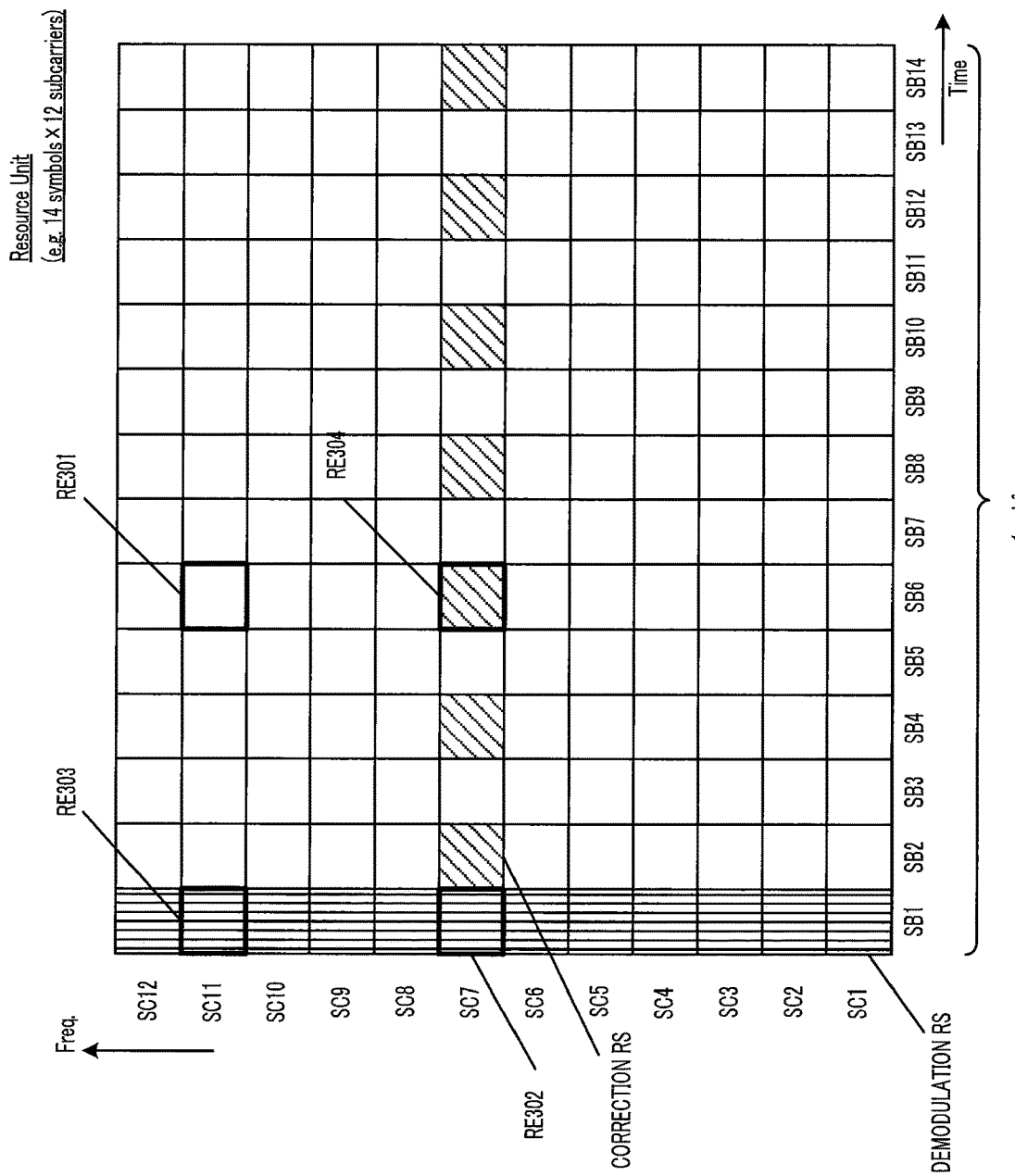
FIG. 3 is a diagram illustrating example mapping according to an embodiment of the present invention.

FIG. 3 illustrates example mapping of the demodulation RS and the correction RS according to the present embodiment. Note that in FIG. 3, a resource unit (RU), which is a unit of resource assignment, is defined by 168 resource elements (REs) each constituted by 14 symbols (SB 1 to SB 14) and 12 subcarriers (SC 1 to SC 12). Also, in FIG. 3, one subframe includes 14 symbols.

The demodulation RS is mapped in the frequency direction and the correction RS is mapped in the time direction. For example, as illustrated in FIG. 3, the demodulation RS is mapped to a first symbol (top symbol) SB 1 on each of the subcarriers (SC 1 to SC 12). Also, the correction RS is mapped to predetermined symbols SB 2, SB 4, SB 6, SB 8, SB 10, SB 12, SB 14 in second and subsequent symbols on subcarrier SC 7.

Where the DL data signal mapped to RE 301 (SC 11, SB 6) in FIG. 3 is demodulated, in user terminal 20, channel estimator 205 calculates a channel estimation value of (SC 7, SB 1) using the demodulation RS mapped to RE 302 and calculates a channel estimation value of (SC 11, SB 1) using the demodulation RS mapped to RE 303. Also, in user terminal 20, channel corrector 206 calculates a channel estimation value of (SC 7, SB 6) using the correction RS mapped to RE 304 and calculates a temporal fluctuation amount occurring in the channel between SB 1 to SB 6 from a difference between the channel estimation value of (SC 7, SB 1) and the channel estimation value of (SC 7, SB 6).

Then, in user terminal 20, demodulator and decoder 207 corrects the channel estimation value of (SC 11, SB 1) using the temporal fluctuation amount of SB 6, calculates the channel estimation value of (SC 11, SB 6) and demodulates the DL data signal mapped to RE 301 using the channel estimation value of (SC 11, SB 6).

Note that for each of symbols on which no correction RS is mapped (for example, SB 7 in FIG. 3), an average value of temporal fluctuation amounts calculated using the correction RS mapped to symbols (SB 6 and SB 8) before and behind the symbol is used as a temporal fluctuation amount of the symbol.

Effects of Present Embodiment

As described above, in the present embodiment, a correction RS is mapped to symbols behind a symbol on which a demodulation RS is mapped and a channel estimation value calculated using the demodulation RS is corrected based on a temporal fluctuation amount calculated using the correction RS. This processing enables, where a demodulation RS is mapped on the front side of a subframe, preventing deterioration in channel estimation accuracy on the rear side of the subframe and thus preventing decrease in communication quality.

[Variation 1 (Layer Multiplexing)]

In the present embodiment, radio base station 10 may cause correction RSs to be orthogonalized to each other between layers and map the correction RSs for the respective layers (layer multiplexing) or may map a correction RS in common to layers (one-layer transmission). Also, radio base station 10 may set antenna port numbers so that each of the antenna port numbers is common with any of port numbers of a demodulation RS or is different from each of port numbers of a demodulation RS.

Figure 4:
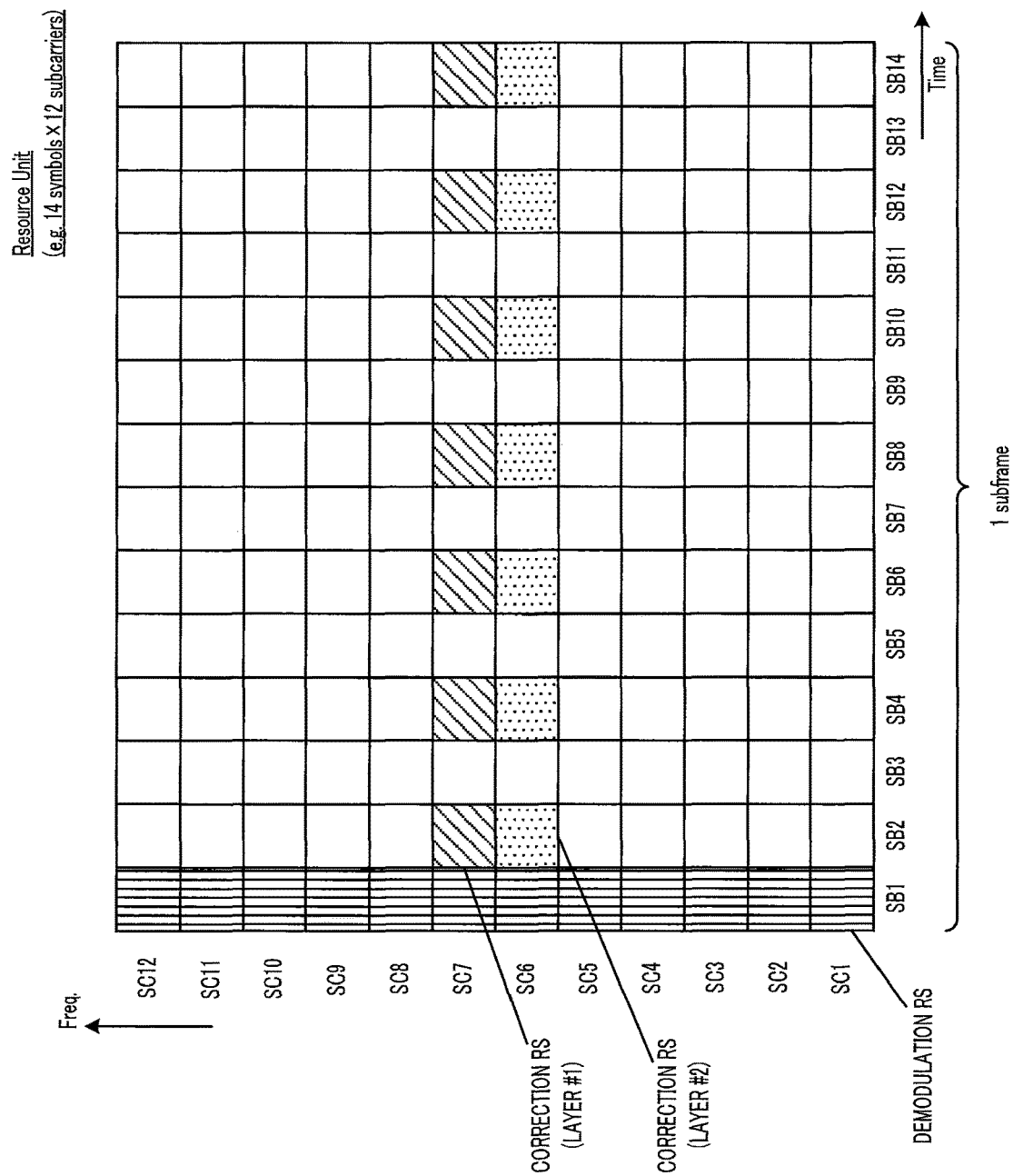
FIG. 4 is a diagram illustrating first example mapping according to variation 1 of an embodiment of the present invention.

FIG. 4 is a diagram illustrating an example in which correction RSs are subjected to layer multiplexing by means of frequency division multiplexing (FDM). In FIG. 4, a correction RS to be used for demodulation of a DL data signal transmitted through layer #1 (hereinafter referred to as a "layer #1 correction RS") is mapped to SB 2, SB 4, SB 6, SB 8, SB 10, SB 12, and SB 14 on SC 7, and a correction RS to be used for demodulation of a DL data signal transmitted through layer #2 (hereinafter referred to as a "layer #2 correction RS") is mapped to SB 2, SB 4, SB 6, SB 8, SB 10, SB 12, and SB 14 on SC 6. In other words, the layer #1 correction RS and the layer #2 correction RS are mapped on mutually different subcarriers.

Figure 5:
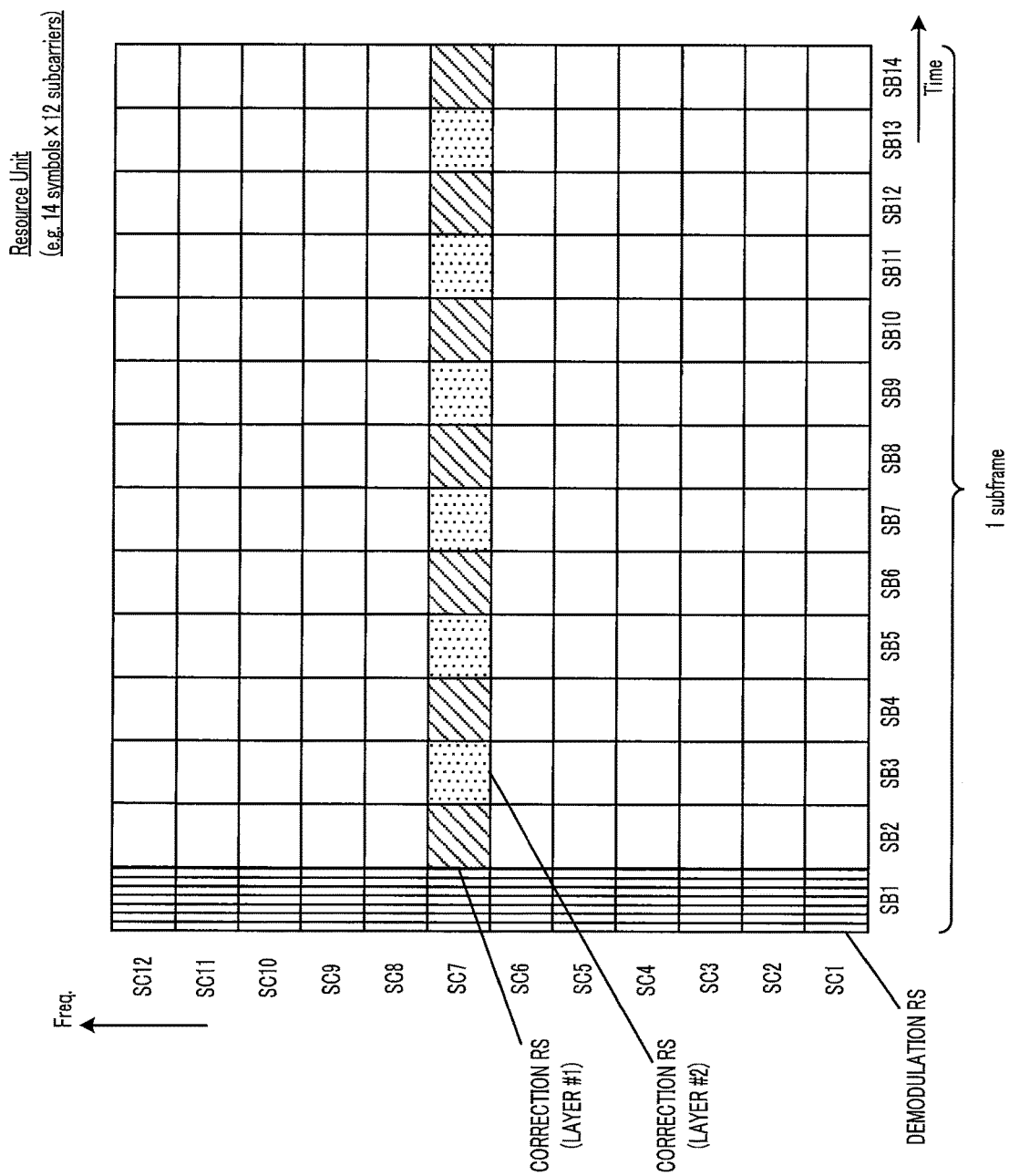
FIG. 5 is a diagram illustrating second example mapping according to variation 1 of an embodiment of the present invention.

FIG. 5 is a diagram illustrating an example in which correction RSs are subjected to layer multiplexing by means of time division multiplexing (TDM). In FIG. 5, a layer #1 correction RS is mapped to SB 2, SB 4, SB 6, SB 8, SB 10, SB 12, and SB 14 on SC 7 and a layer #2 correction RS is mapped to SB 3, SB 5, SB 7, SB 9, SB 11, and SB 13 on SC 7. In other words, the layer #1 correction RS and the layer #2 correction RS are mapped to mutually different symbols.

Figure 6:
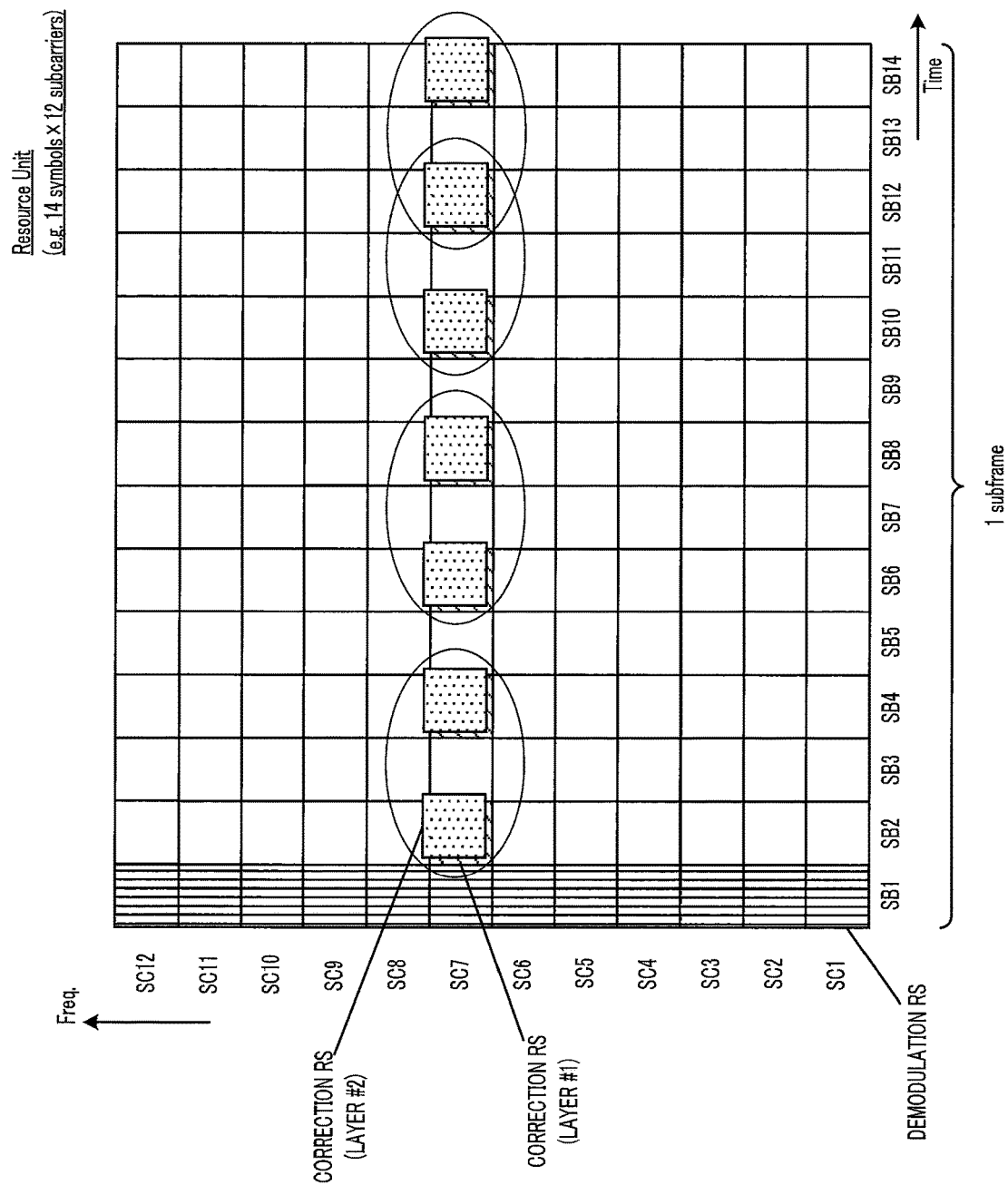
FIG. 6 is a diagram illustrating third example mapping according to variation 1 of an embodiment of the present invention.

FIG. 6 is a diagram illustrating an example in which correction RSs are subjected to layer multiplexing by means of code division multiplexing (CDM). In FIG. 6, a layer #1 correction RS and a layer #2 correction RS are both mapped to SB 2, SB 4, SB 6, SB 8, SB 10, SB 12, and SB 14 on SC 7. Then, in two symbols, SB 2 and SB 4, a code (for example, (0, 0)) of the layer #1 correction RS and a code (for example, (0, 1)) of the layer #2 correction RS are orthogonal to each other. Likewise, in each of a symbol set of SB 6 and SB 8, a symbol set of SB 10 and SB 12, and a symbol set of SB 12 and SB 14, the code of the layer #1 correction RS and the code of the layer #2 correction RS are orthogonal to each other.

Figure 7:
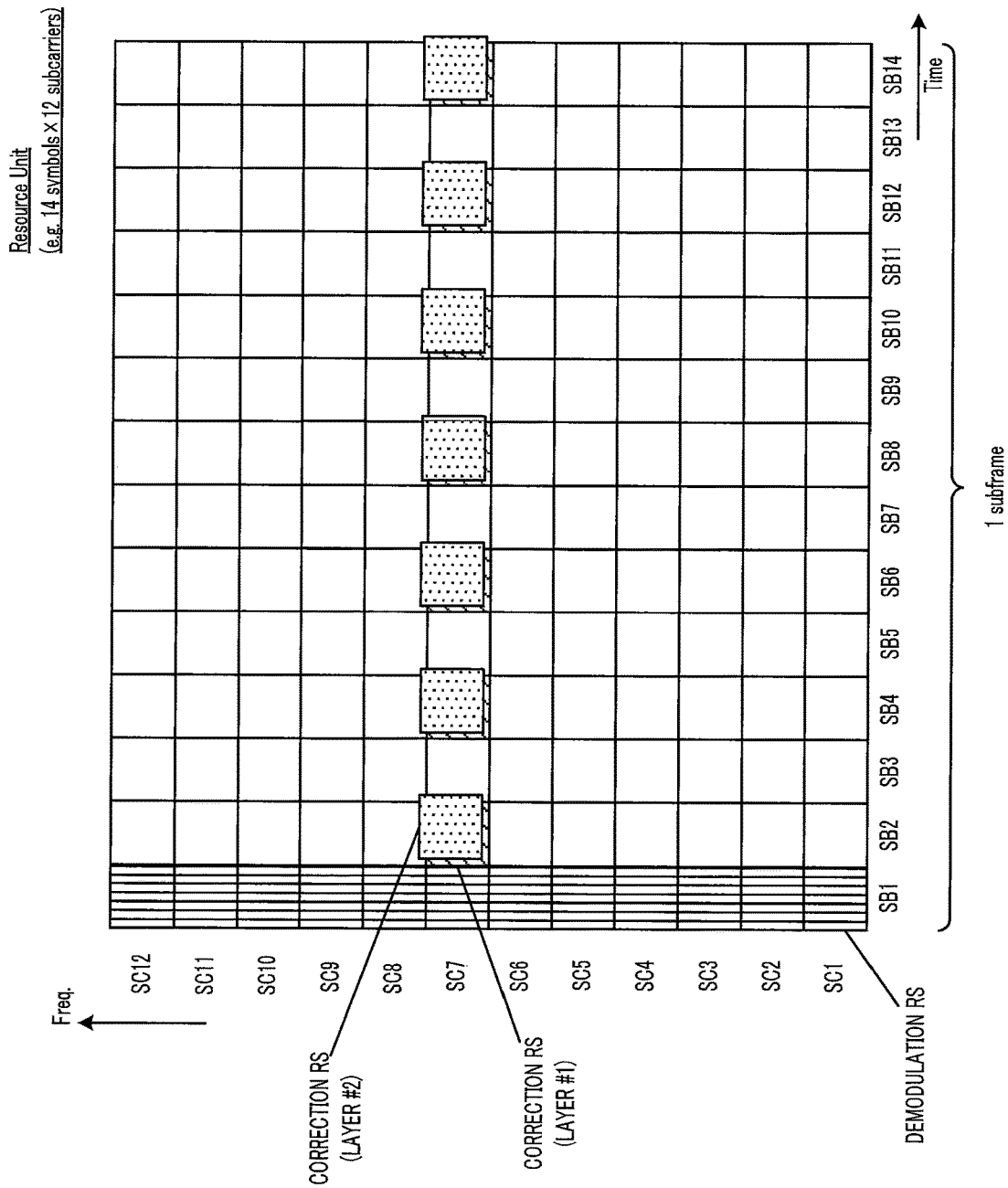
FIG. 7 is a diagram illustrating fourth example mapping according to variation 1 of an embodiment of the present invention.

FIG. 7 is a diagram illustrating an example in which correction RSs are subjected to layer multiplexing by means of space division multiplexing (SDM). In FIG. 7, a layer #1 correction RS and a layer #2 correction RS are both mapped to SB 2, SB 4, SB 6, SB 8, SB 10, SB 12, and SB 14 on SC 7. Then, the layer #1 correction RS and the layer #2 correction RS are transmitted from radio base station 10 to user terminal 20 via mutually different spatial transmission channels.

As described above, as a result of corrections RS being orthogonalized to each other between layers and being mapped for respective layers, the correction accuracy can be enhanced compared to the case where corrections RSs are mapped in common to layers. Note that the case where layer multiplexing is performed by means of CDM or SDM enables reduction in overhead compared to the case where layer multiplexing is performed by means of FDM or TDM.

Figure 8A:
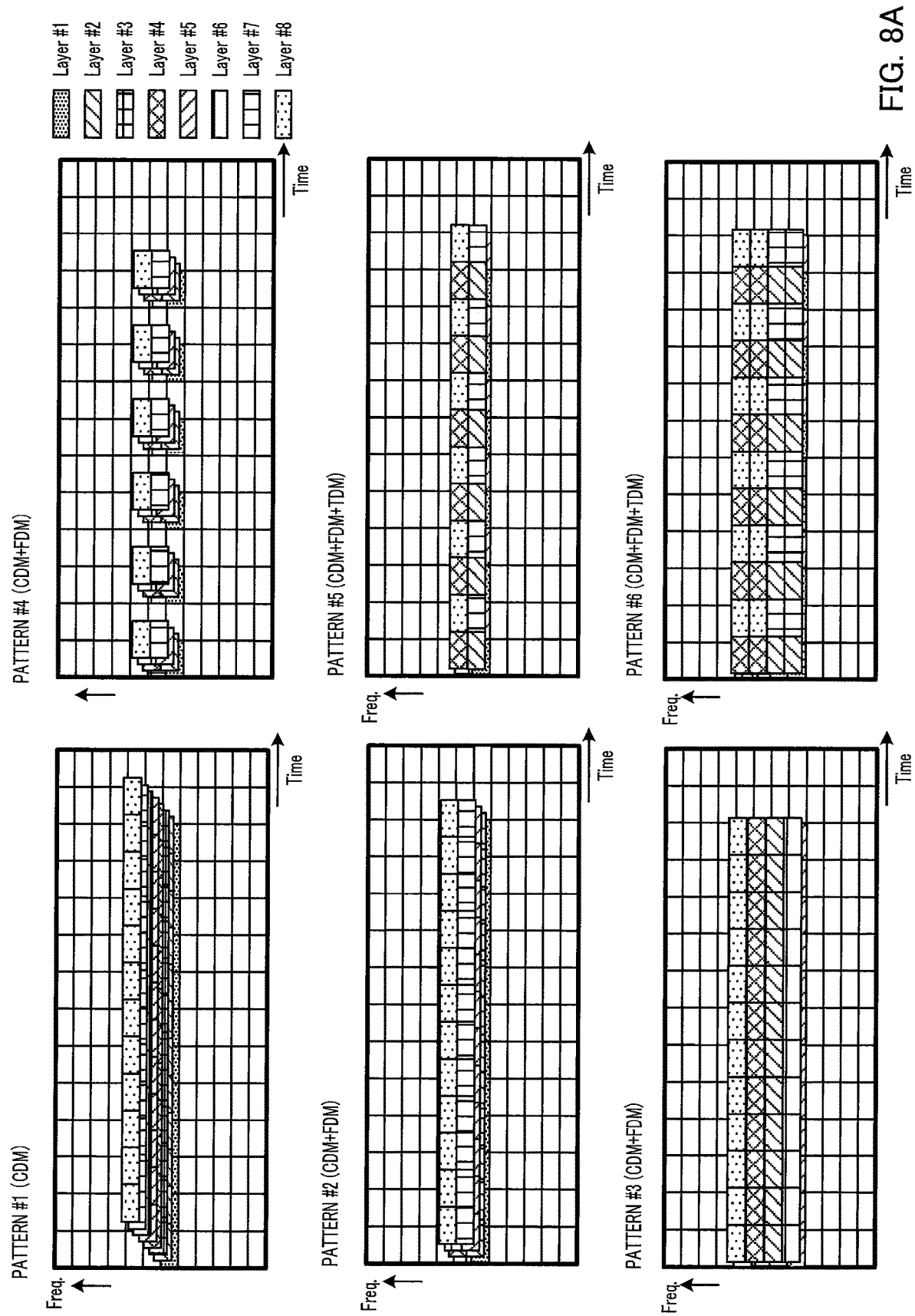
FIG. 8A is a diagram illustrating fifth example mapping according to variation 1 of an embodiment of the present invention.
Figure 8B:
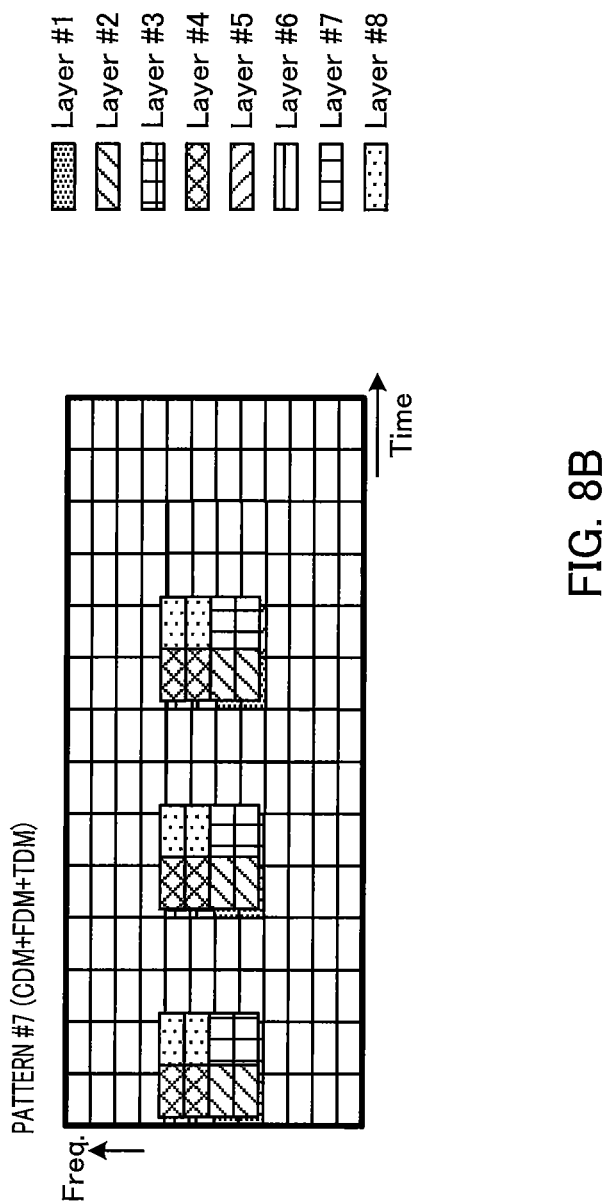
FIG. 8B is a diagram illustrating fifth example mapping according to variation 1 of an embodiment of the present invention.

Also, where there is a large number of layers, correction RSs may be subjected to layer multiplexing using a combination of CDM or SDM, and FDM and/or TDM. FIGS. 8A and 8B are diagrams illustrating an example in which where the number of layers is 8, correction RSs are subjected to layer multiplexing. Note that in FIGS. 8A and 8B, illustration of a demodulation RS is omitted. In FIGS. 8A and 8B, pattern #1 is an example in which correction RSs are subjected to layer multiplexing by means of CDM alone. Also, each of patterns #2, #3, #4 is an example in which correction RSs are subjected to layer multiplexing by means of a combination of CDM and FDM. Also, each of patterns #5, #6, #7 is an example in which correction RSs are subjected to layer multiplexing by means of a combination of CDM, FDM, and TDM. Note that in FIGS. 8A and 8B, SDM can be used instead of CDM.

[Variation 2 (Mapping Positions in RU)]

Figure 9:
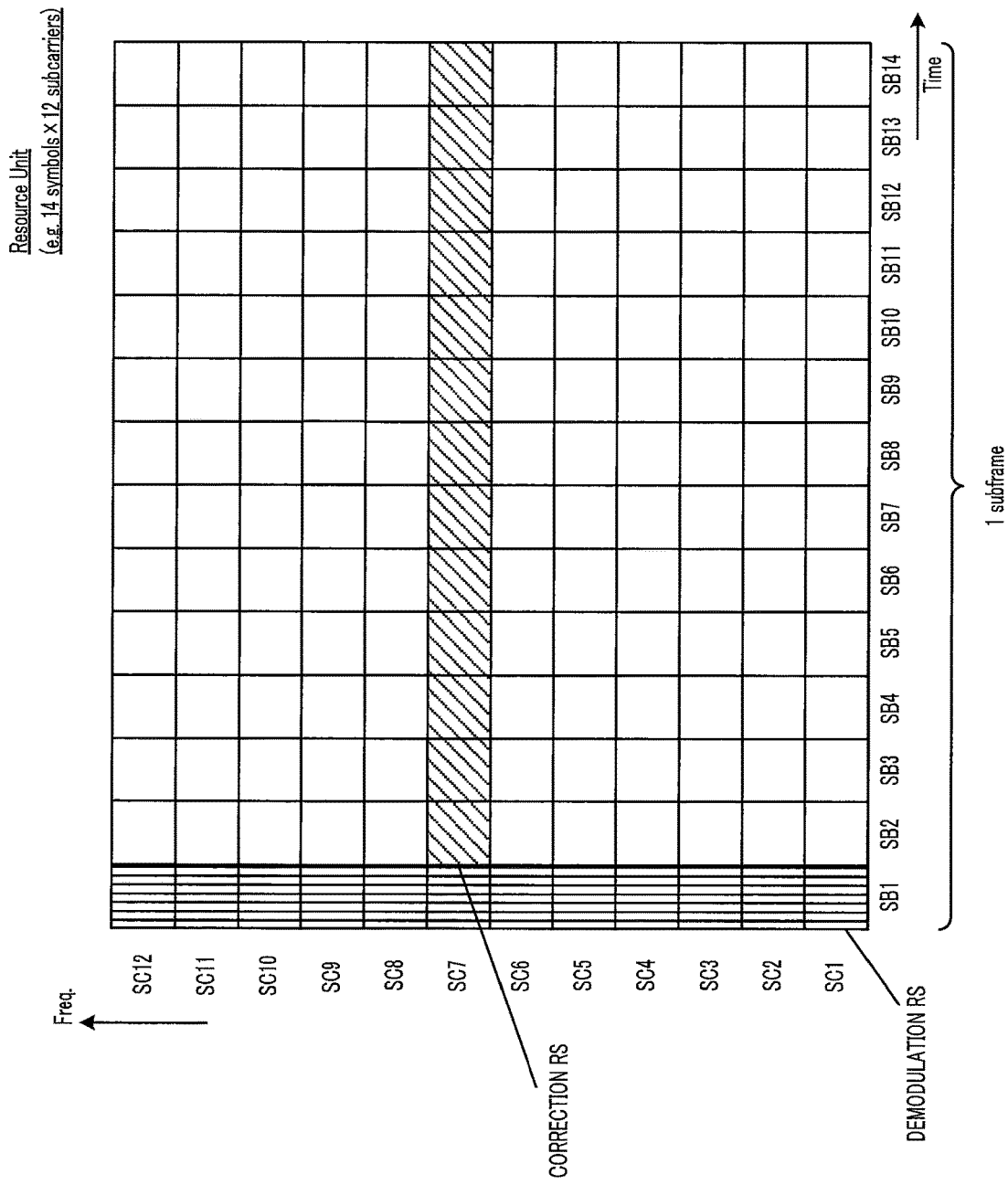
FIG. 9 is a diagram illustrating first example mapping according to variation 2 of an embodiment of the present invention.

In the present embodiment, there is no specific limitation on positions (for example, the number of positions, intervals of positions) of mapping of a correction RS in each RU. For example, as illustrated in FIG. 9, radio base station 10 may map a correction RS over all second and subsequent symbols on predetermined subcarrier SC 7. As described above, dense mapping of a correction RS enables enhancement in capability of following temporal fluctuation.

Figure 10:
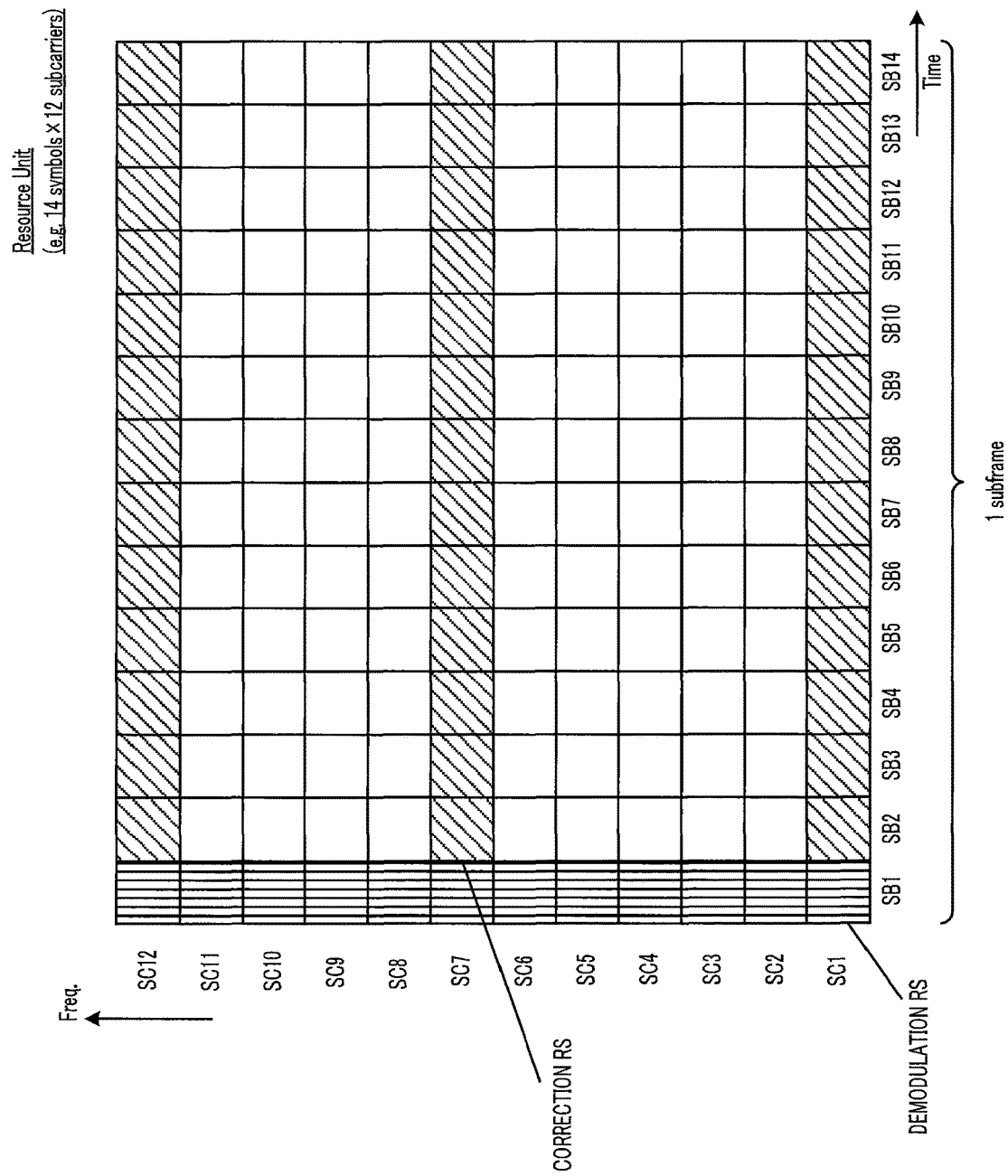
FIG. 10 is a diagram illustrating second example mapping according to variation 2 of an embodiment of the present invention.

Furthermore, as illustrated in FIG. 10, radio base station 10 may map a correction RS on each of all of second and subsequent symbols on each of a plurality of subcarriers SC 1, SC 7, SC 12. As described above, as a result of correction RSs being mapped densely in the frequent direction, resistance to frequency selective fading can be enhanced.

Figure 11:
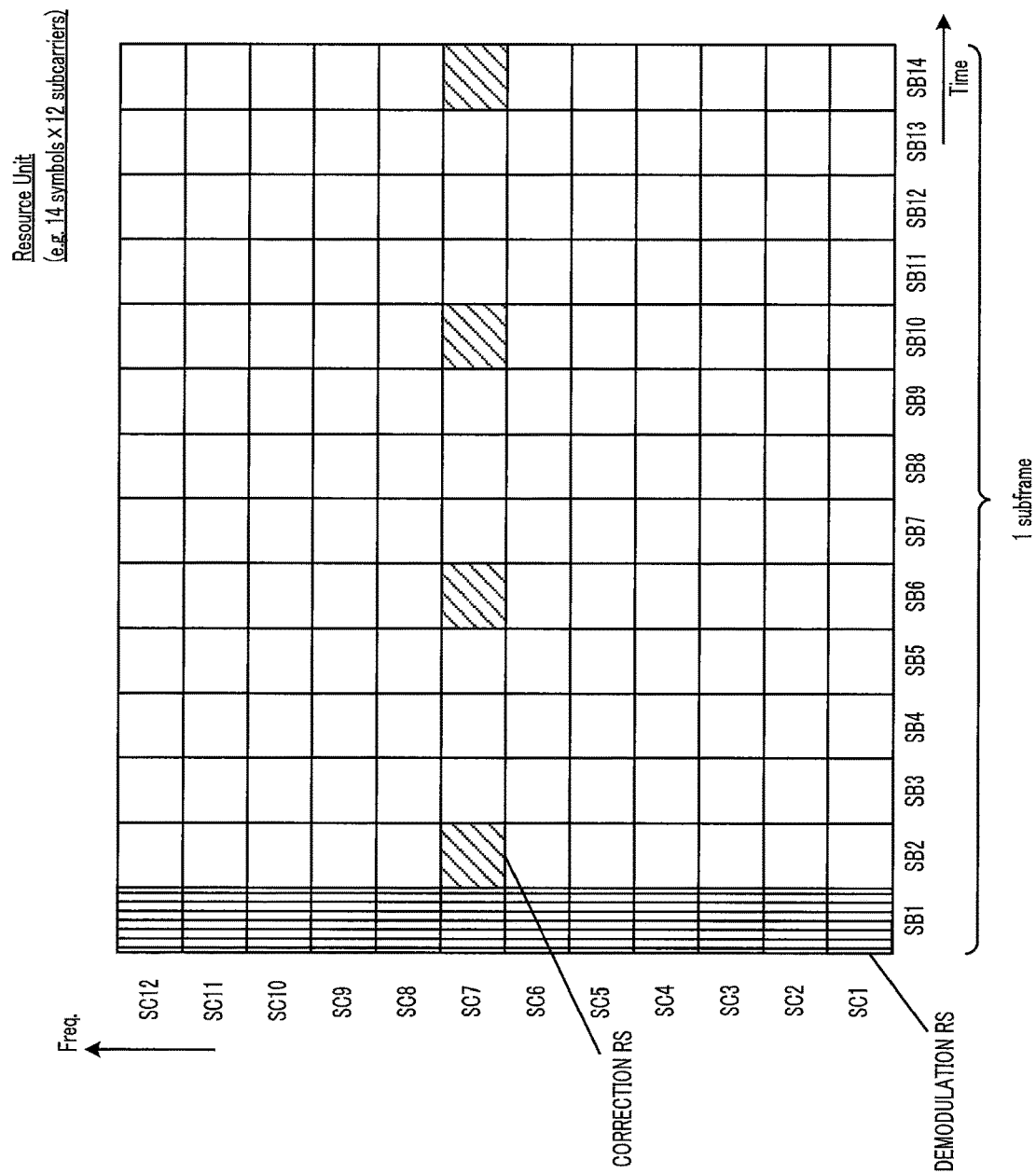
FIG. 11 is a diagram illustrating third example mapping according to variation 2 of an embodiment of the present invention.

On the other hand, as illustrated in FIG. 11, radio base station 10 may sparsely map a correction RS. In this case, the overhead can be reduced.

Figure 12B:
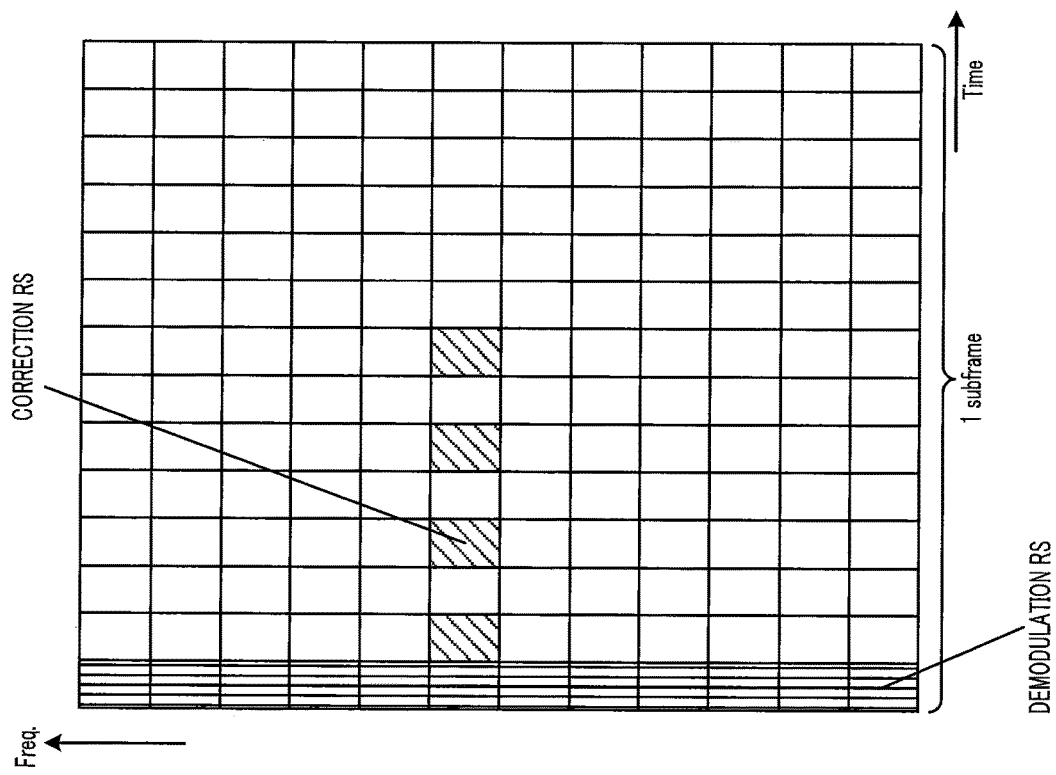
FIG. 12B is a diagram illustrating fourth example mapping according to variation 2 of an embodiment of the present invention.
Figure 12A:
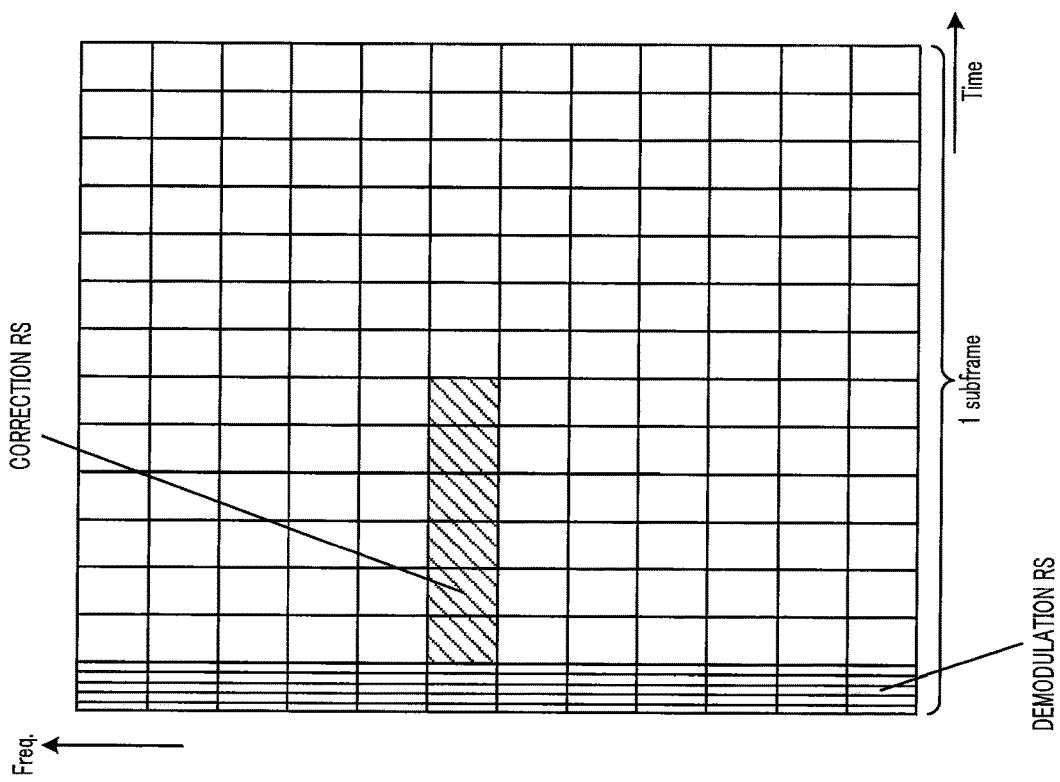
FIG. 12A is a diagram illustrating fourth example mapping according to variation 2 of an embodiment of the present invention.

Also, as illustrated in FIGS. 12A and 12B, radio base station 10 may map a correction RS only on symbols in the front half. In this case, although the temporal following capability deteriorates in symbols in the rear half, time of processing for channel estimation can be reduced and thus the overhead can be reduced.

Figure 13B:
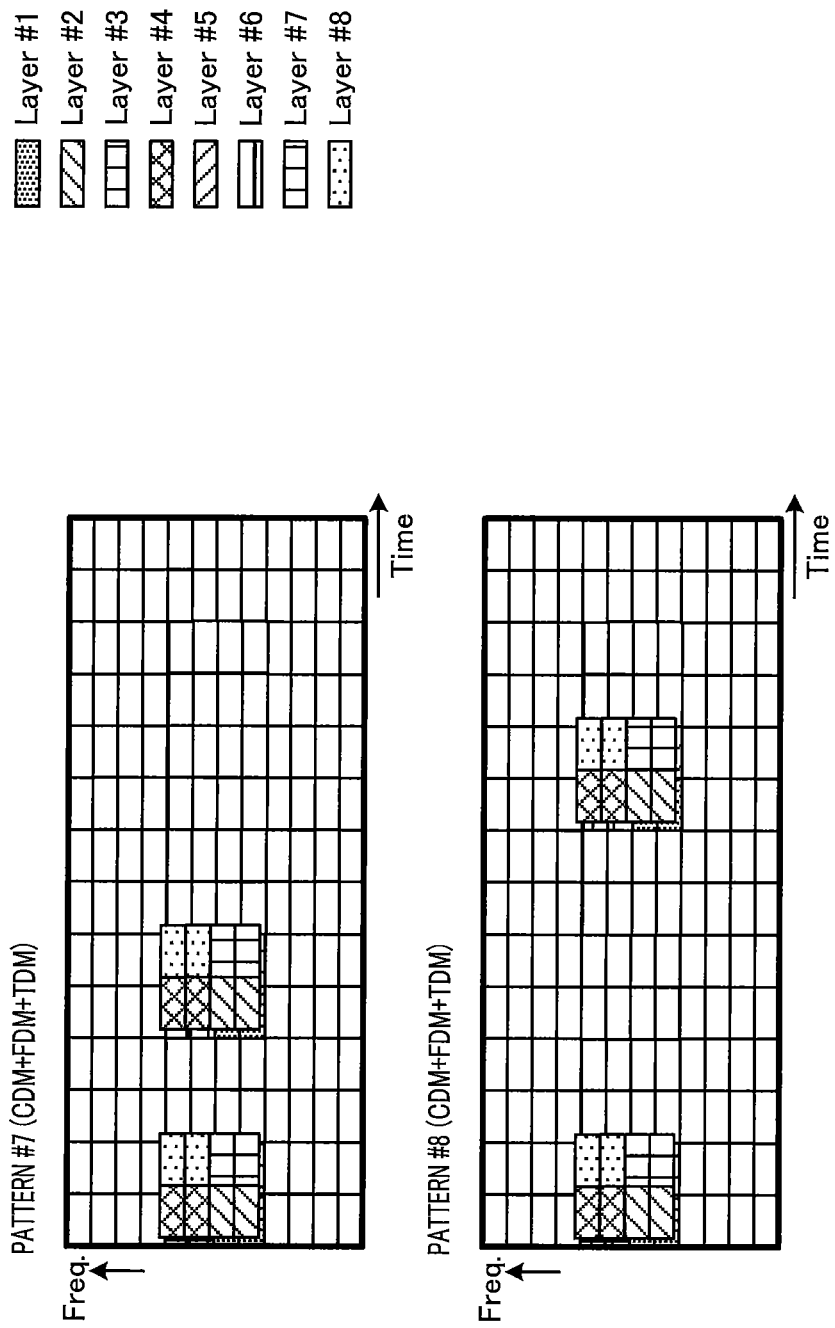
FIG. 13B is a diagram illustrating fifth example mapping according to variation 2 of an embodiment of the present invention.

Also, even when a correction RS is mapped to symbols in the front half, radio base station 10 may cause correction RSs to be orthogonalized between layers and map the correction RSs for the respective layers (layer multiplexing) or may be mapped in common to the layers. Also, where there are a large number of layers, correction RSs may be subjected to layer multiplexing using a combination of CDM or SDM, and FDM and/or TDM only for symbols in the front half. FIGS. 13A and 13B are diagrams illustrating an example in which where the number of layers is 8, correction RSs are subjected to layer multiplexing only on symbols in the front half. Note that in FIGS. 13A and 13B, illustration of a demodulation RS is omitted. In FIGS. 13A and 13B, pattern #1 is an example in which correction RSs are subjected to layer multiplexing only on symbols in the front half by means of CDM alone. Also, each of patterns #2, #3, #4 is an example in which correction RSs are subjected to layer multiplexing only on symbols in the front half by means of a combination of CDM and FDM. Also, each of patterns #5, #6, #7 is an example in which correction RSs are subjected to layer multiplexing only on symbols in the front half by means of a combination of CDM, FDM, and TDM. Pattern #8 in FIGS. 13A and 13B is an example in which respective parts of correction RSs are subjected to layer multiplexing on symbols in the rear half relative to pattern #7. Note that in FIGS. 13A and 13B, SDM may be employed instead of CDM.

Figure 14B:
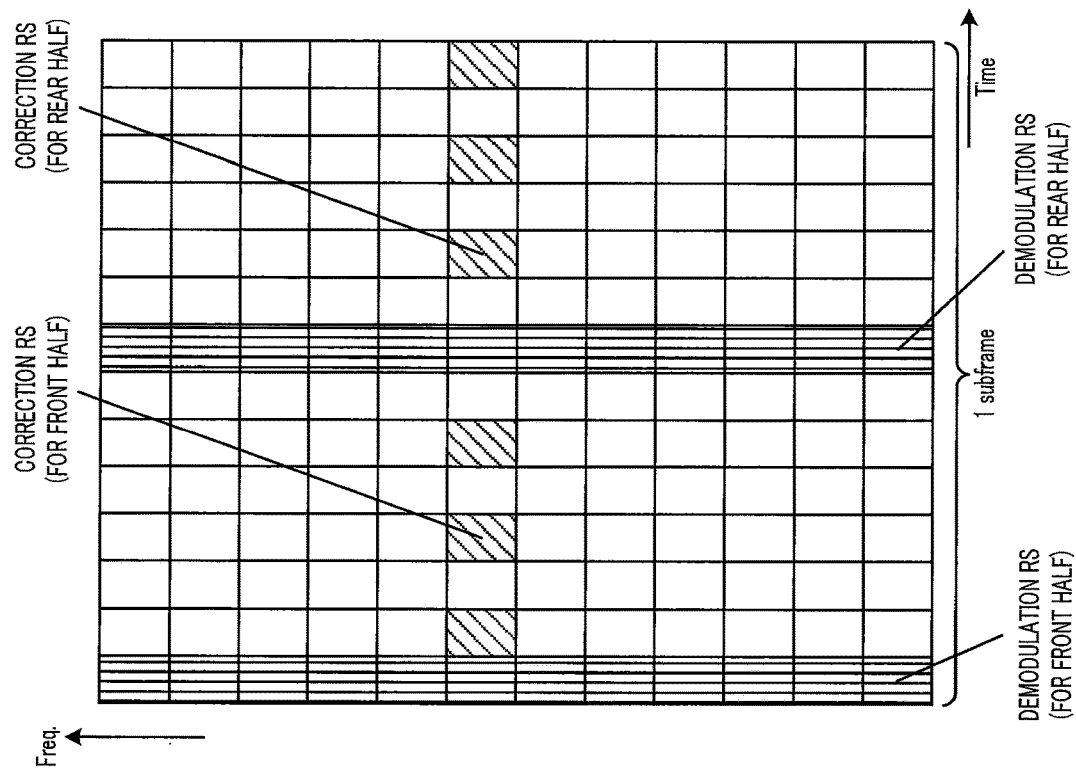
FIG. 14B is a diagram illustrating sixth example mapping according to variation 2 of an embodiment of the present invention.
Figure 14A:
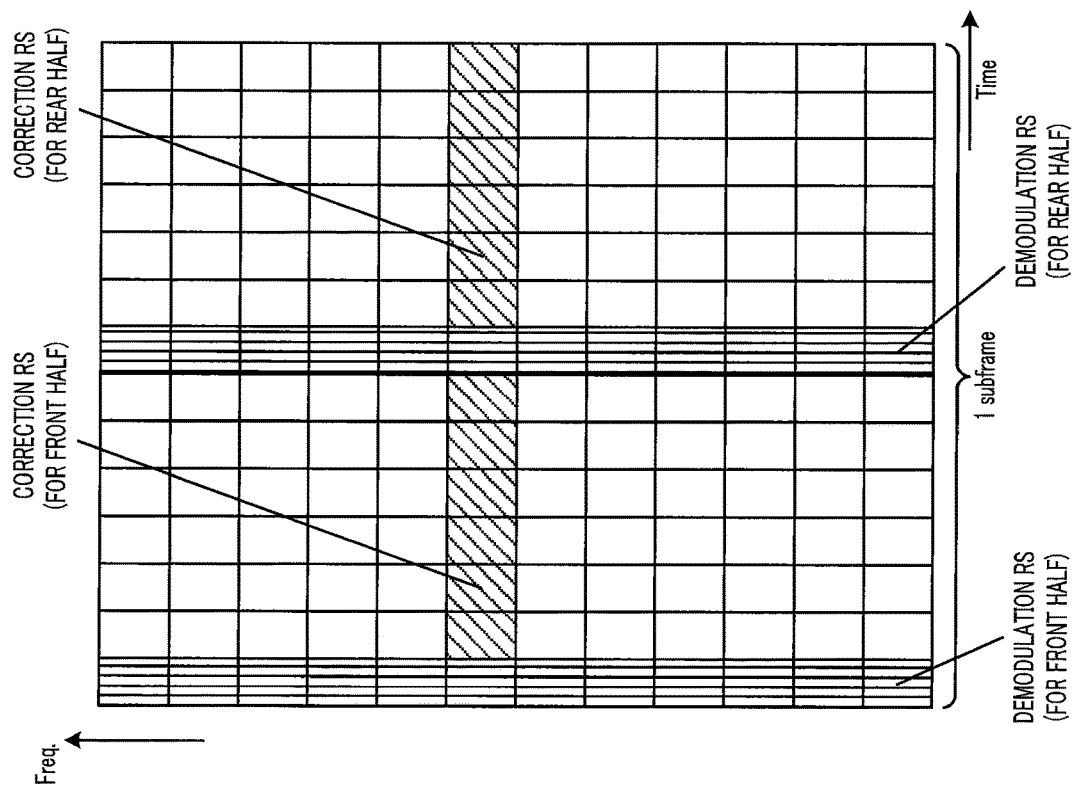
FIG. 14A is a diagram illustrating sixth example mapping according to variation 2 of an embodiment of the present invention.

Also, as illustrated in FIGS. 14A and 14B, where a demodulation RS is mapped to a top symbol for the front half and a demodulation RS is mapped to a symbol other than the top symbol for the rear half, radio base station 10 may map a correction RS to each of symbols in the front half and symbols in the rear half. In this case, for a DL data signal mapped to the symbols in the front half, user terminal 20 performs demodulation processing using the demodulation RS mapped to the top symbol and the correction RS mapped to the symbols in the front half. Also, for a DL data signal mapped to the symbols in the rear half, user terminal 20 performs demodulation processing using the demodulation RS mapped to the symbol other than the top symbol and the correction RS mapped to the symbols in the rear half.

Also, where a demodulation RS is mapped to a top symbol for the front half and a demodulation RS is mapped to a symbol other than the top symbol for the rear half, radio base station 10 may map a common correction RS. In this case, for a DL data signal mapped to symbols in the front half, user terminal 20 performs demodulation processing using a correction RS that is in common with the demodulation RS mapped to the top symbol. Also, for a DL data signal mapped to symbols in the rear half, user terminal 20 performs demodulation processing using a correction RS that is in common with the demodulation RS mapped to the symbol other than the top symbol.

Also, as illustrated in FIGS. 15A and 15B, where another signal (for example, an RS or a DCH) is mapped to an RE to which a correction RS is to be mapped (RE 401 (SC 7, SB 14) in FIG. 15A) (where the resources overlap) because of scheduling, radio base station 10 may map not the correction RS but another signal to the RE or may map not another signal but the correction RS to the RE.

Figure 16B:
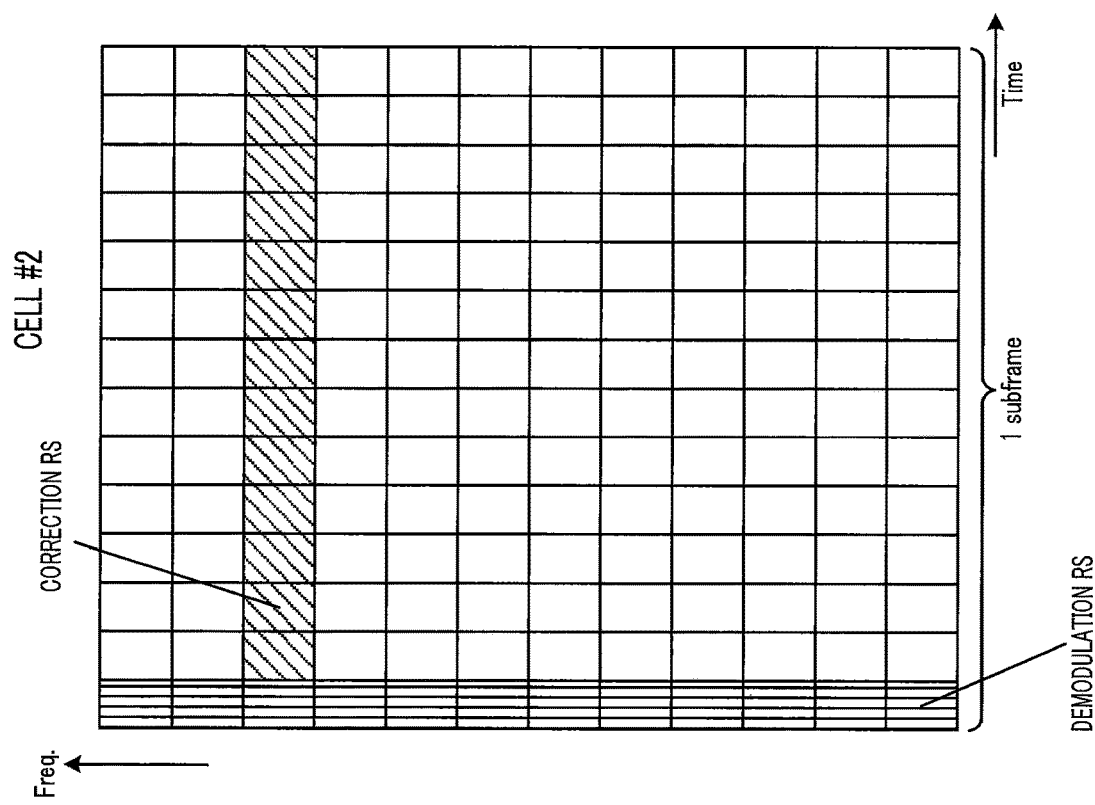
FIG. 16B is a diagram illustrating eighth example mapping according to variation 2 of an embodiment of the present invention.
Figure 16A:
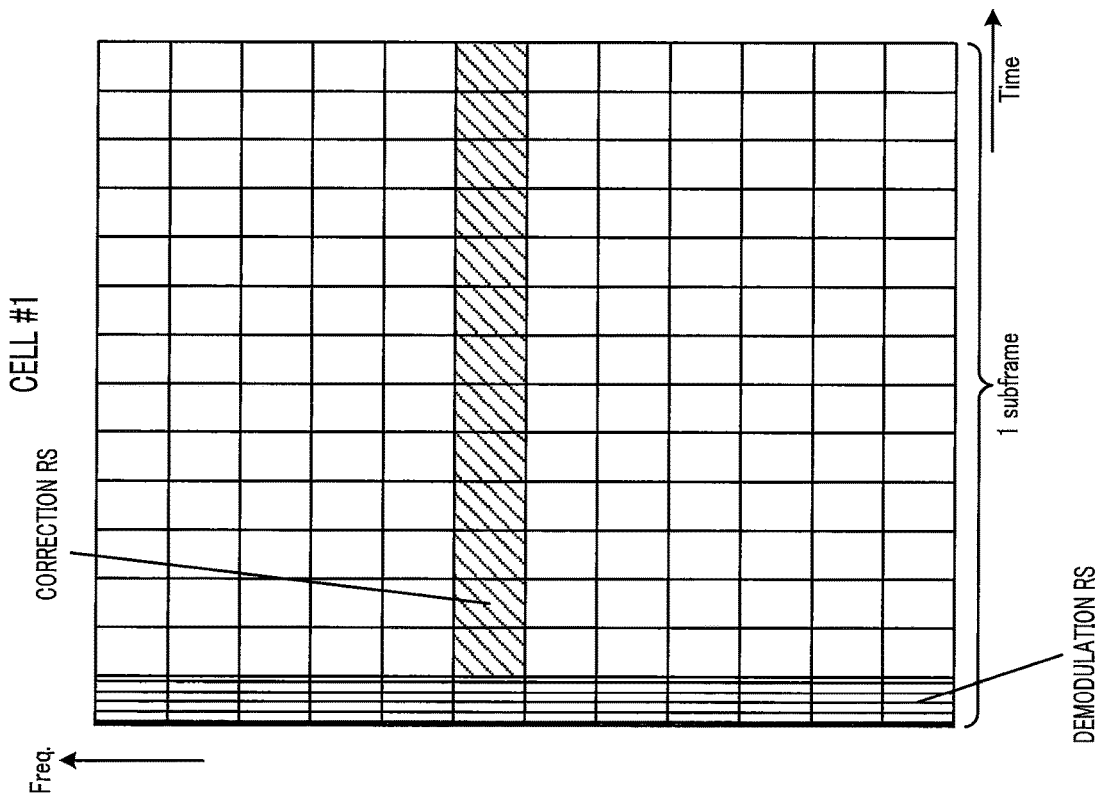
FIG. 16A is a diagram illustrating eighth mapping example according to variation 2 of an embodiment of the present invention.

Also, as illustrated in FIGS. 16A and 16B, radio base station 10 may map correction RSs in such a manner that the correction RSs do not overlap between cells neighboring each other. In the case of FIG. 16, radio base station 10 for cell #1 maps a correction RS to SC 7 (FIG. 16A) and radio base station 10 for cell #2 maps a correction RS to SC 10 (FIG. 16B).

As described above, mapping correction RSs in such a manner that the correction RSs do not overlap between cells neighboring each other enables suppression in an effect of interference where no precoding is performed between the neighboring cells.

Figure 17A:
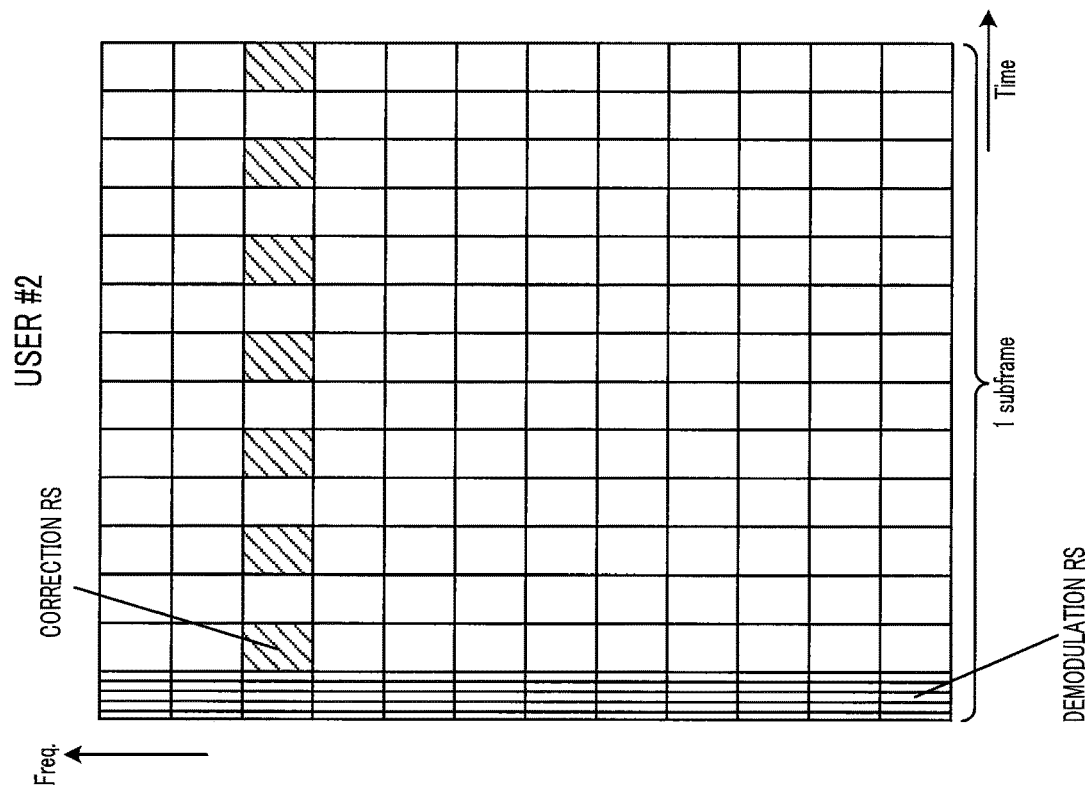
FIG. 17A is a diagram illustrating ninth example mapping according to variation 2 of an embodiment of the present invention.
Figure 17B:
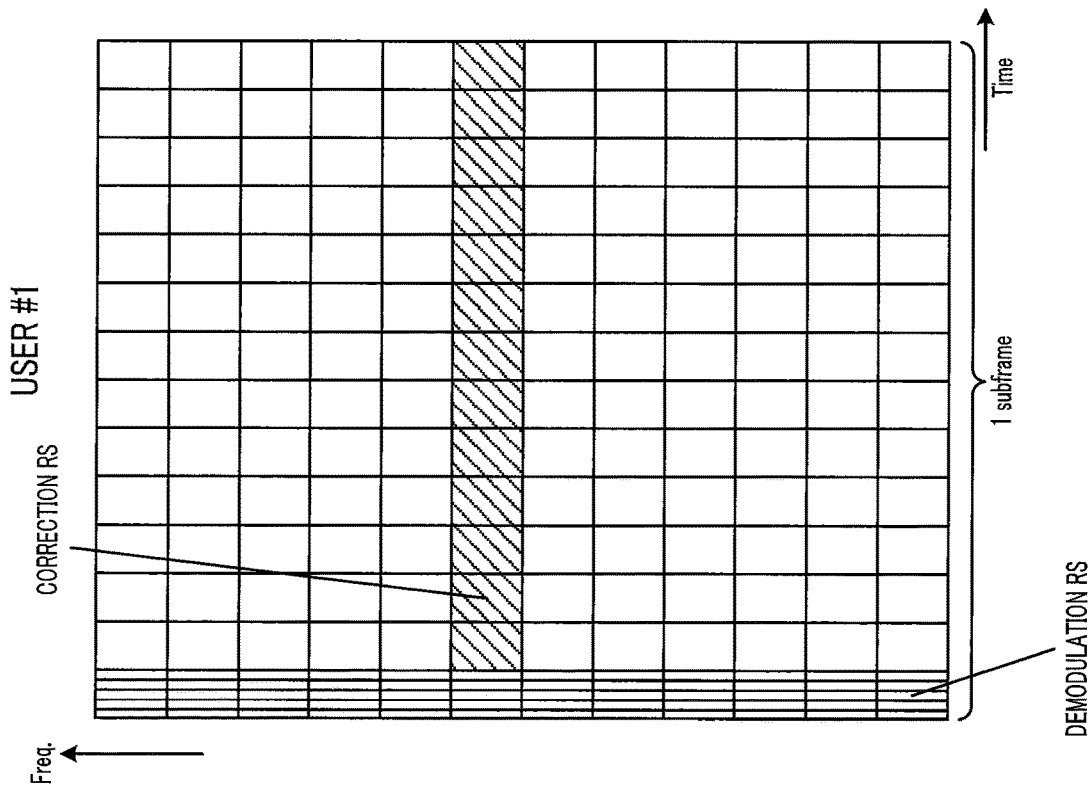
FIG. 17B is a diagram illustrating ninth example mapping according to variation 2 of an embodiment of the present invention.

Also, as illustrated in FIGS. 17A and 17B, radio base station 10 may control a mapping pattern of a correction RS for each user terminal 20 or for each of RUs assigned to user terminals 20. For example, radio base station 10 controls mapping patterns and maps a correction RS more for a user with a high average moving speed. In the case of FIG. 17, radio base station 10 maps a correction RS over all of second and subsequent symbols for user #1 with an average moving speed that is equal to or exceeding a threshold value (FIG. 17A) and maps a correction RS to second and subsequent symbols with a cycle of two symbols for user #2 with an average moving speed that is below the threshold value (FIG. 17B).

Alternatively, radio base station 10 may control mapping patterns and map a correction RS more for a user with poor reception quality (high NACK rate).

Alternatively, radio base station 10 may control mapping patterns and map a correction RS more (for example, on symbols in the rear half of a subframe) for a user terminal with high signal processing performance (short delay time in signal processing).

As described above, controlling a mapping pattern of a correction RS for each user terminal 20 or for each of RUs assigned to user terminals 20 enables enhancement in reception quality of the entire system. Note that where a moving speed of user terminal 20 varies, a mapping pattern of correction RSs may be controlled according to the moving speed of user terminal 20.

[Variation 3 (Cycle of Insertion in Frequency Direction)]

Figure 18:
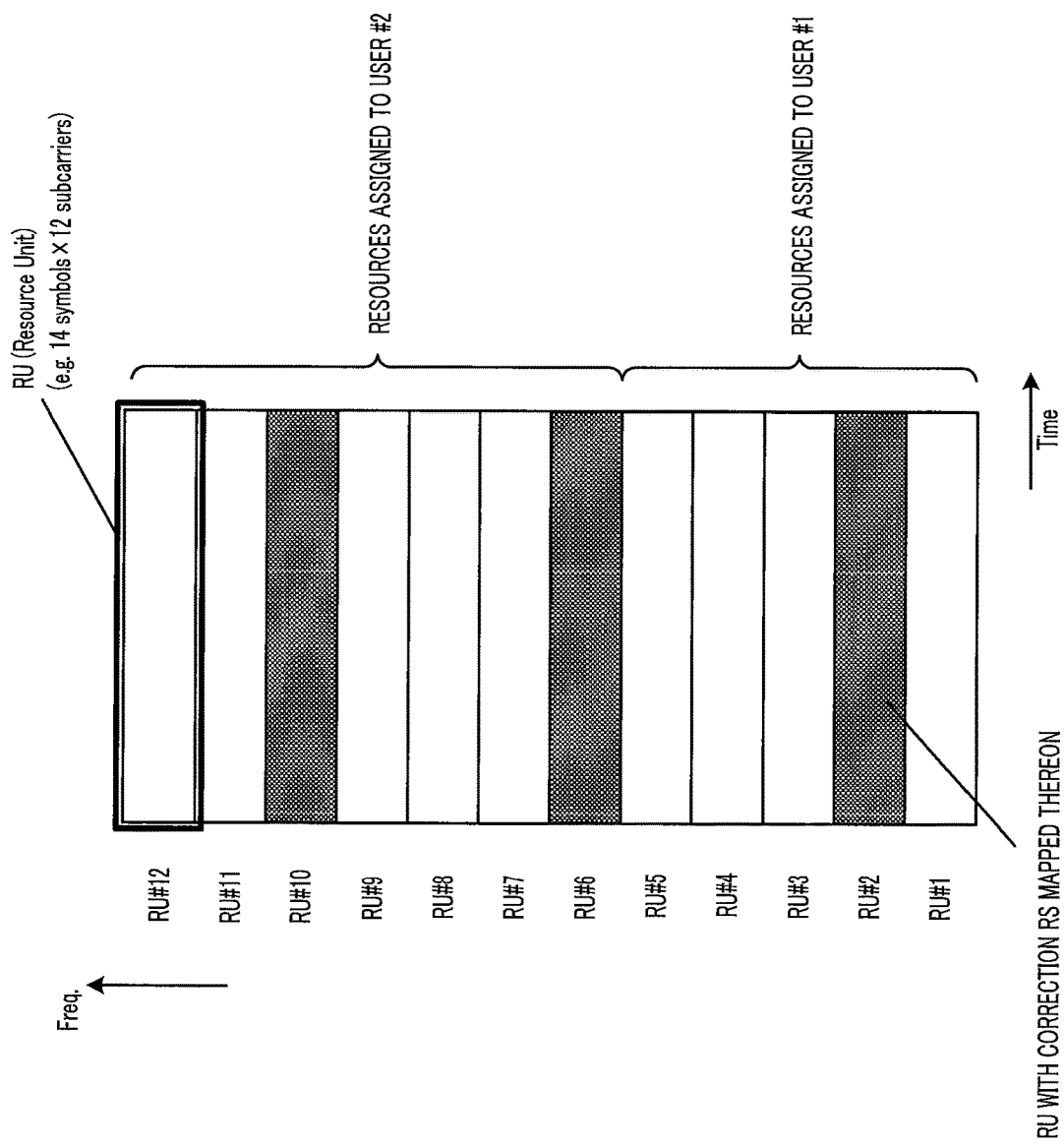
FIG. 18 is a diagram illustrating first example mapping according to variation 3 of an embodiment of the present invention.

Also, in the present embodiment, there is no specific limitation also on a cycle of mapping of a correction RS in the frequency direction of RUs. For example, as illustrated in FIG. 18, radio base station 10 may determine a cycle of an RU in which a correction RS is mapped as p (p is a plural number: p=4 in FIG. 18) and prevent a correction RS from being mapped on another RU. Lengthening a cycle of an RU in which a correction RS is mapped (decreasing the rate) enables reduction in overhead.

In the case of FIG. 18, user terminal 20 of user #1 calculates a temporal fluctuation amount using a correction RS mapped on RU #2 and performs demodulation processing for RUs #1 to #5 using the temporal fluctuation amount. Also, user terminal 20 of user #2 calculates a temporal fluctuation amount using a correction RS mapped on RU #6 and performs demodulation processing for RUs #6, #7, #8 using the temporal fluctuation amount, calculates a temporal fluctuation amount using a correction RS mapped on RU #10, and performs demodulation processing for RUs #9, #10, #11, #12 using the temporal fluctuation amount. Alternatively, user terminal 20 of user #2 calculates a temporal fluctuation amount by means of interpolation processing such as averaging or linear interpolation using correction RSs mapped on RU #6 and RU #10 and performs demodulation processing for RUs #6, #7, #8, #9, #10, #11, #12 using the temporal fluctuation amount.

Figure 19:
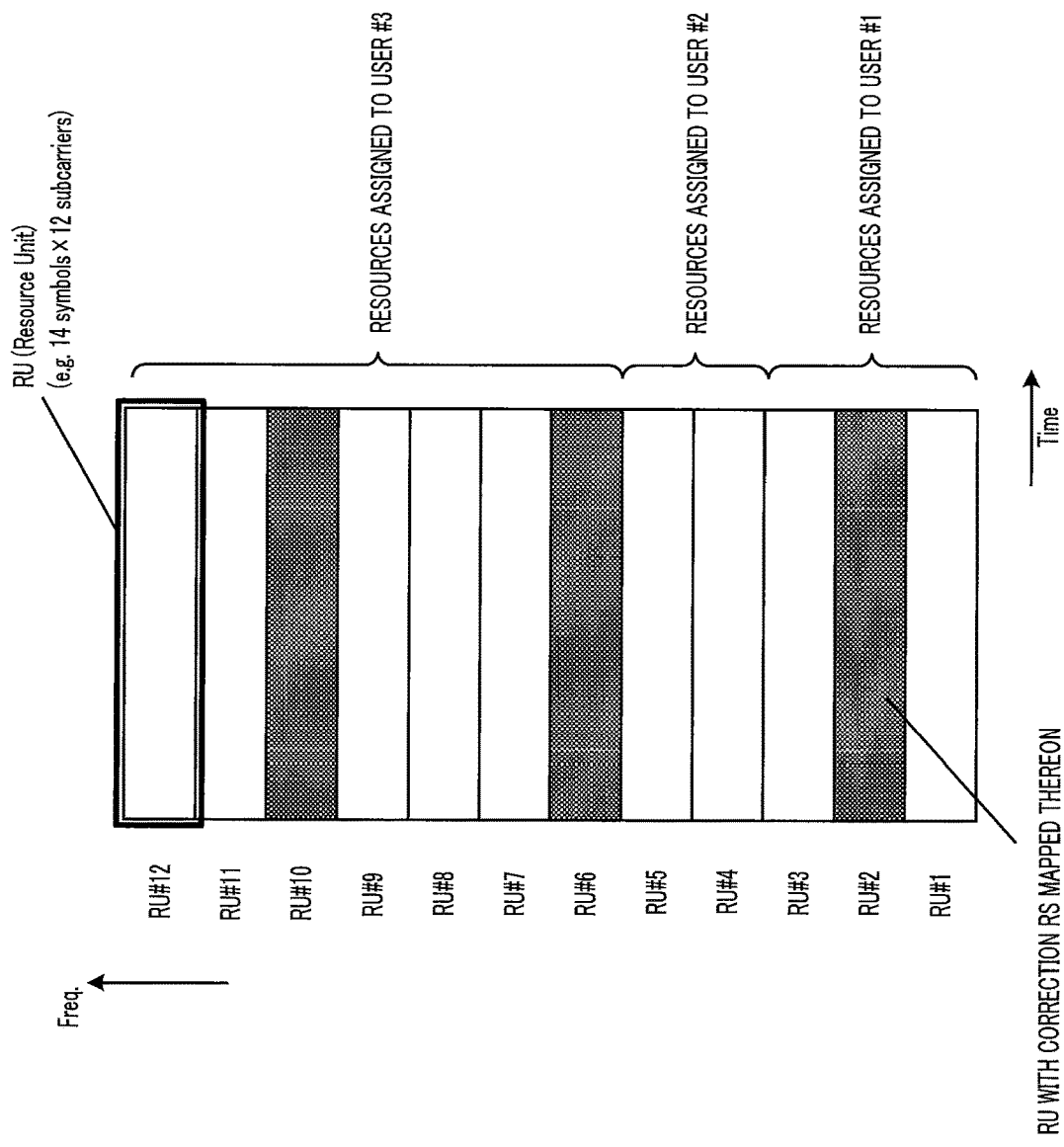
FIG. 19 is a diagram illustrating second example mapping according to variation 3 of an embodiment of the present invention.

Also, as illustrated in FIG. 19, where there is user terminal 20 for which no RU with a correction RS mapped thereon is provided in resources assigned to the relevant user terminal (user #2 in FIG. 19), relevant user terminal 20 calculates a temporal fluctuation amount using a correction RS in an RU close to a resource assigned to the relevant user terminal from among RUs on which a correction RS is mapped. In the case of FIG. 19, user terminal 20 of user #2 calculates a temporal fluctuation amount using corrections RS mapped on RU #2 and RU #6 and performs demodulation processing for RUs #4, #5 using the temporal fluctuation amount.

Figure 20:
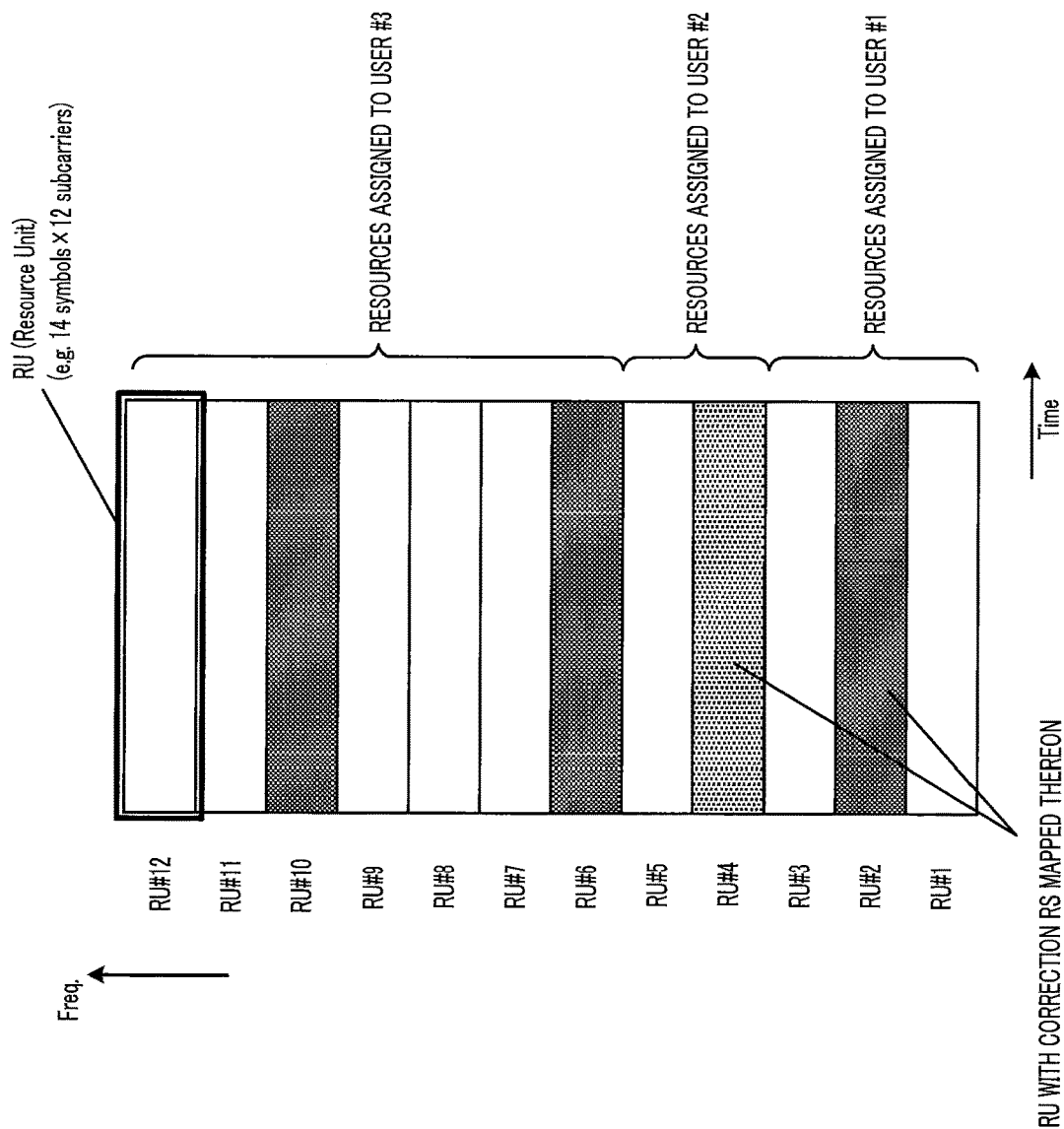
FIG. 20 is a diagram illustrating third example mapping according to variation 3 of an embodiment of the present invention.

Also, as illustrated in FIG. 20, radio base station 10 may add an RU on which a correction RS is mapped so that a correction RS is mapped on at least one RU within resources assigned to user terminal 20 (RU #4 in FIG. 20). In the case of FIG. 20, user terminal 20 of user #2 calculates a temporal fluctuation amount using a correction RS mapped on RU #4 and performs demodulation processing for RUs #4, #5 using the temporal fluctuation amount. Note that user terminal 20 of user #1 calculates a temporal fluctuation amount using a correction RS mapped on RU #2 and performs demodulation processing for RUs #1, #2, #3 using the temporal fluctuation amount. Also, user terminal 20 of user #3 calculates a temporal fluctuation amount using a correction RS mapped on RU #6 and performs demodulation processing for RUs #6, #7, #8 using the temporal fluctuation amount, and calculates a temporal fluctuation amount using a correction RS mapped on RU #10 and performs demodulation processing for RUs #9, #10, #11, #12 using the temporal fluctuation amount. Alternatively, user terminal 20 of user #3 calculates a temporal fluctuation amount by means of processing such as averaging or linear interpolation using the corrections RS mapped on RU #6 and RU #10 and performs demodulation processing for RUs #6, #7, #8, #9, #10, #11, #12 using the temporal fluctuation amount.

Figure 21:
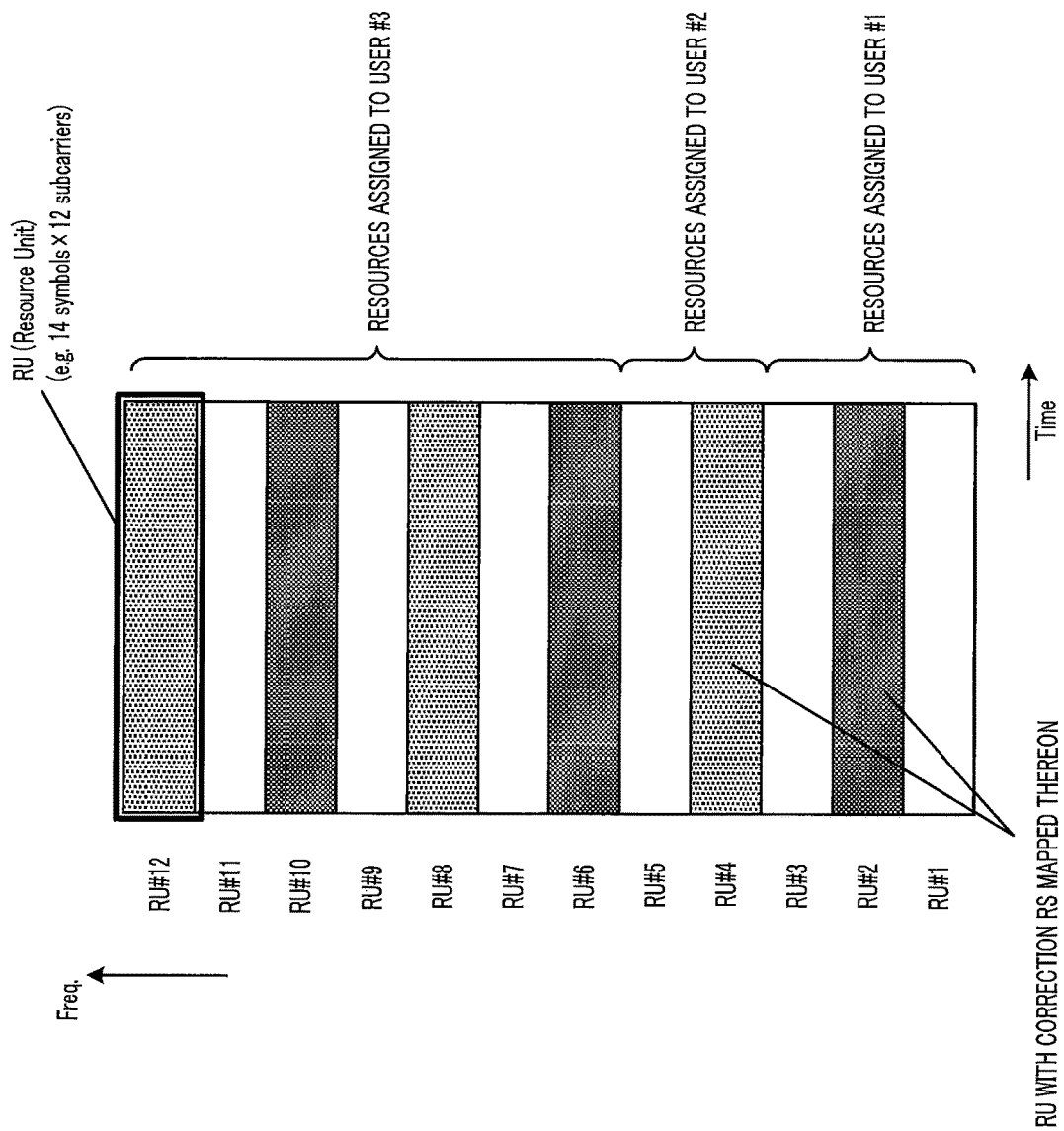
FIG. 21 is a diagram illustrating fourth example mapping according to variation 3 of an embodiment of the present invention.

Also, as illustrated in FIG. 21, radio base station 10 may change a cycle in the frequency direction of an RU in which a correction RS is mapped and map a correction RS to at least one RU within resources assigned to each user terminal 20. In the case of FIG. 21, radio base station 10 maps correction RSs to RUs at a rate of one RU in two RUs so that a correction RS is mapped on a resource assigned to user terminal 20 of user #2.

[Variation 4 (Cycle of Insertion in Time Direction)]

Also, in the present embodiment, there is also no specific limitation on a cycle in the time direction of a subframe to which a correction RS is mapped. For example, as illustrated in FIG. 22, radio base station 10 may determine a cycle of a subframe on which a correction RS is mapped as q (q is a plural number: q=2 in FIG. 22) and map no correction RS on another subframes. Lengthening the cycle (decreasing the rate) of a subframe on which a correction RS is mapped enables reduction in overhead.

Also, the cycle in the time direction of a subframe on which a correction RS is mapped may be set in common with a cell or as illustrated in FIG. 23, may individually be set for respective users. For example, radio base station 10 performs control so that a rate of a subframe to which a correction RS is mapped is larger for a user with a higher average moving speed. In the case of FIG. 23, radio base station 10 maps a correction RS on a subframe at a rate of one subframe in two subframes for user #1 having an average moving speed that is equal to or exceeds a threshold value and maps a correction RS on a subframe at a rate of one subframe in three subframes for user #2 having an average moving speed that is below the threshold value.

Figure 24:
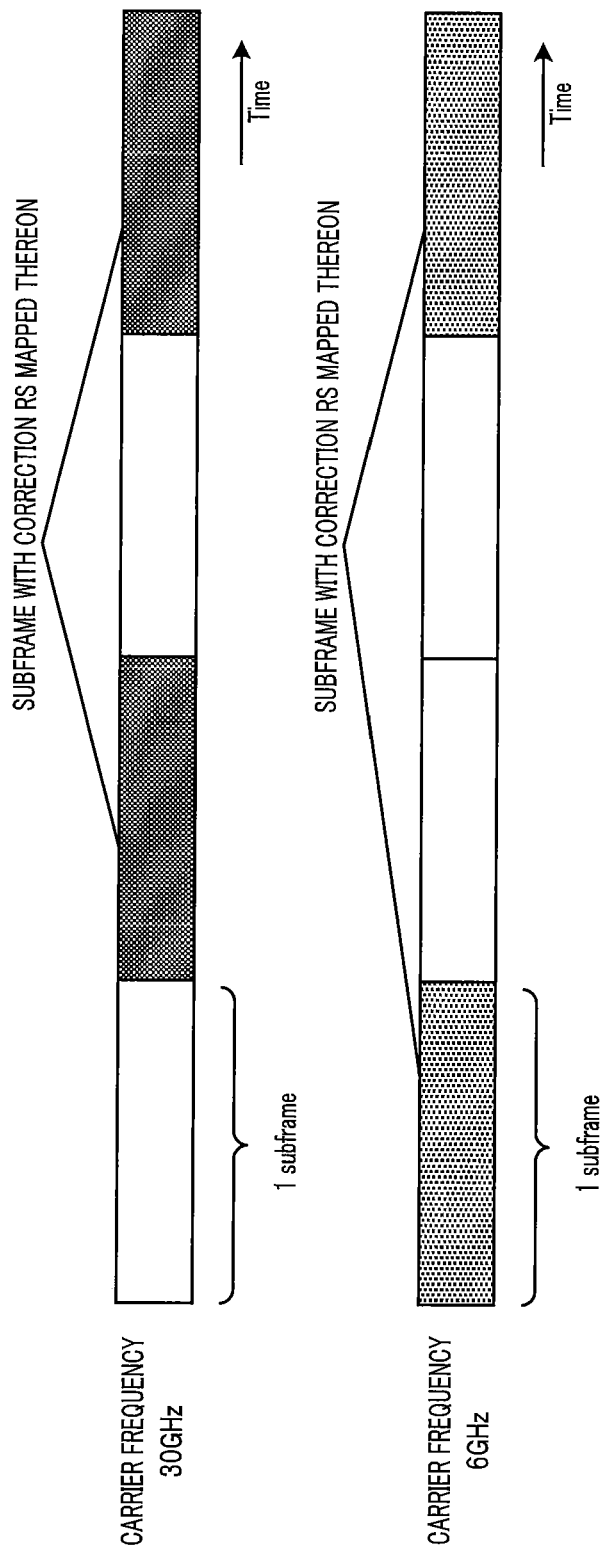
FIG. 24 is a diagram illustrating third example mapping according to variation 4 of an embodiment of the present invention.

Also, as illustrated in FIG. 24, radio base station 10 may set the cycle in the time direction of a subframe on which a correction RS is mapped, according to a carrier frequency. In the case of FIG. 24, radio base station 10 maps a correction RS on a subframe at a rate of one subframe in two subframes where the carrier frequency is 30 GHz and maps a correction RS on a subframe at a rate of one subframe in three subframes where the carrier frequency is 6 GHz.

Figure 25:
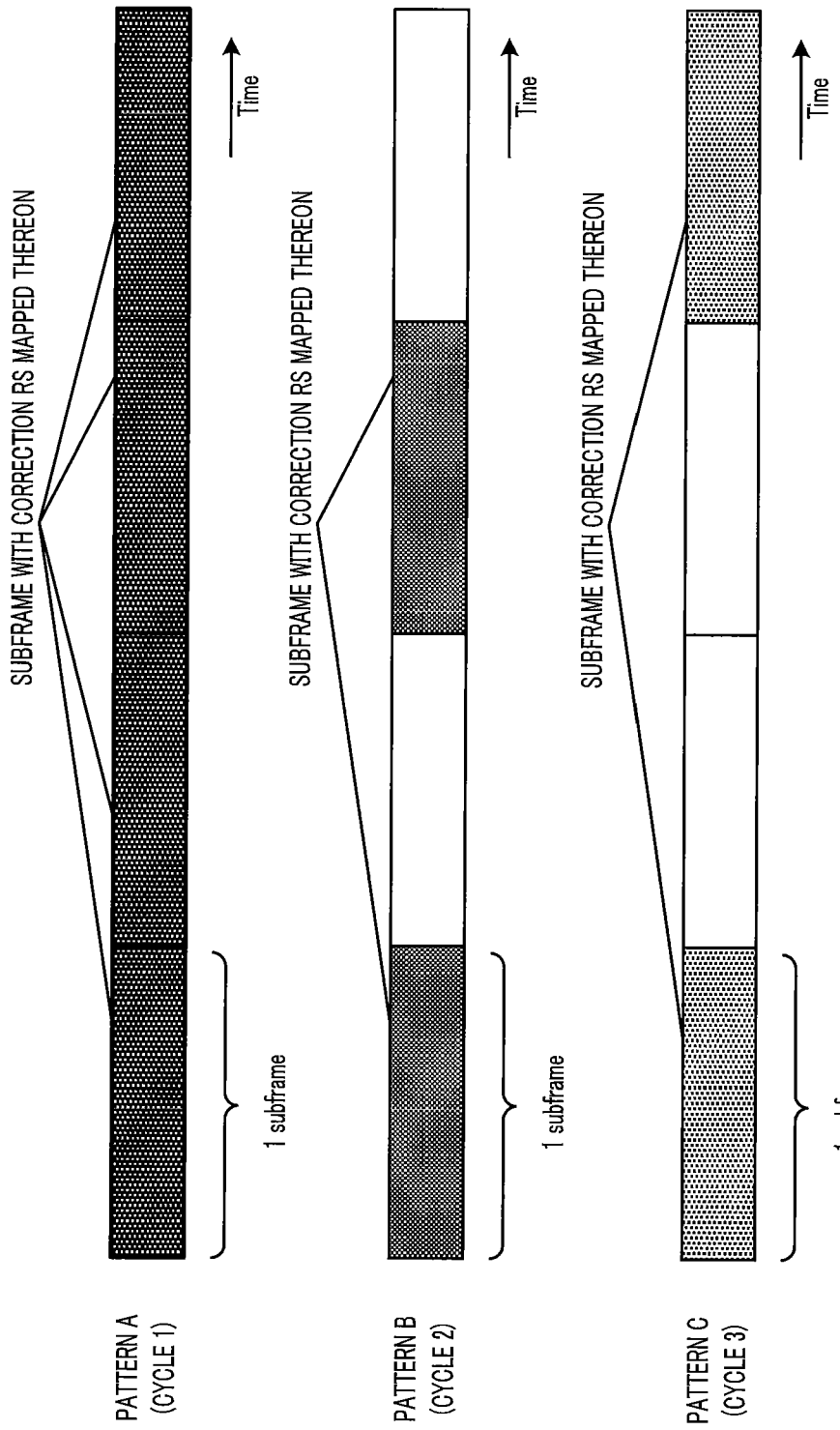
FIG. 25 is a diagram illustrating fourth example mapping according to variation 4 of an embodiment of the present invention.

Also, radio base station 10 may set the cycle in the time direction of a subframe on which a correction RS is mapped so that respective user terminals 20 can be detected in a blind manner. For example, as illustrated in FIG. 25, three types of patterns, pattern A in which a correction RS is mapped on each of all of subframes (cycle 1), pattern B in which a correction RS is mapped at a rate of one subframe in two subframes (cycle 2), and pattern C in which a correction RS is mapped on a subframe at a rate of one subframe in three subframes (cycle 3), are provided. In this case, user terminal 20 can identify a pattern by detecting correction RS(s) from four consecutive subframes in a blind manner. As a result of user terminal 20 performing the blind detection, radio base station 10 does not need to transmit information (signaling) indicating the pattern to user terminal 20, enabling reduction in overhead.

[Variation 5 (User Multiplexing)]

Also, in the present embodiment, where correction RSs are subjected to multi user (MU)-MIMO multiplexing, as in the case of layer multiplexing, correction RSs for respective users may be multiplexed by means of any of FDM, TDM, CDM, and SDM or a combination of two or more of FDM, TDM, CDM, and SDM.

Figure 26:
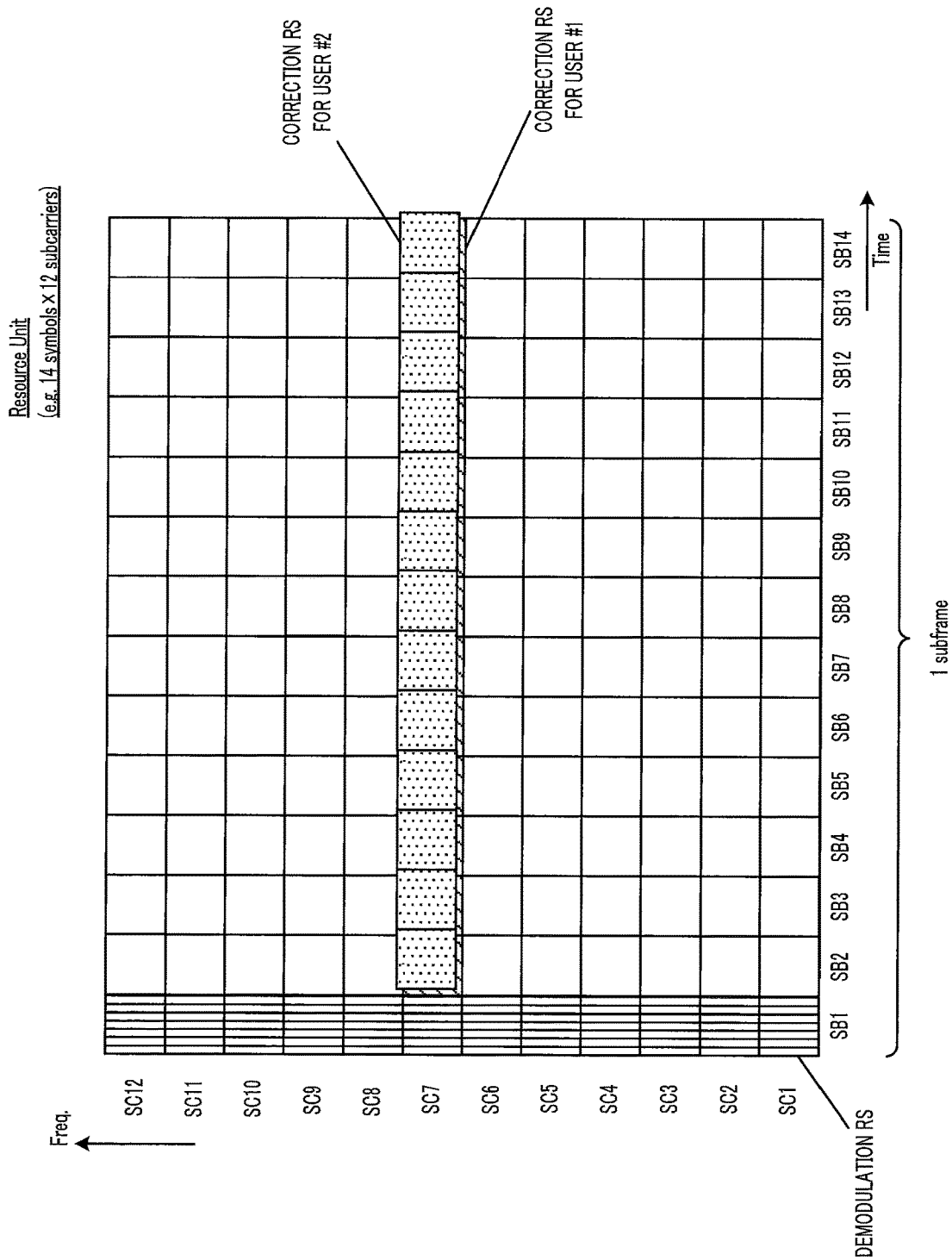
FIG. 26 is a diagram illustrating first example mapping according to variation 5 of an embodiment of the present invention.

FIG. 26 is a diagram illustrating an example in which correction RSs for respective users are multiplexed by means of CDM. In FIG. 26, a correction RS for user #1 and a correction RS for user #2 are both mapped to symbols SB 2 to SB 14 on SC 7.

Figure 27B:
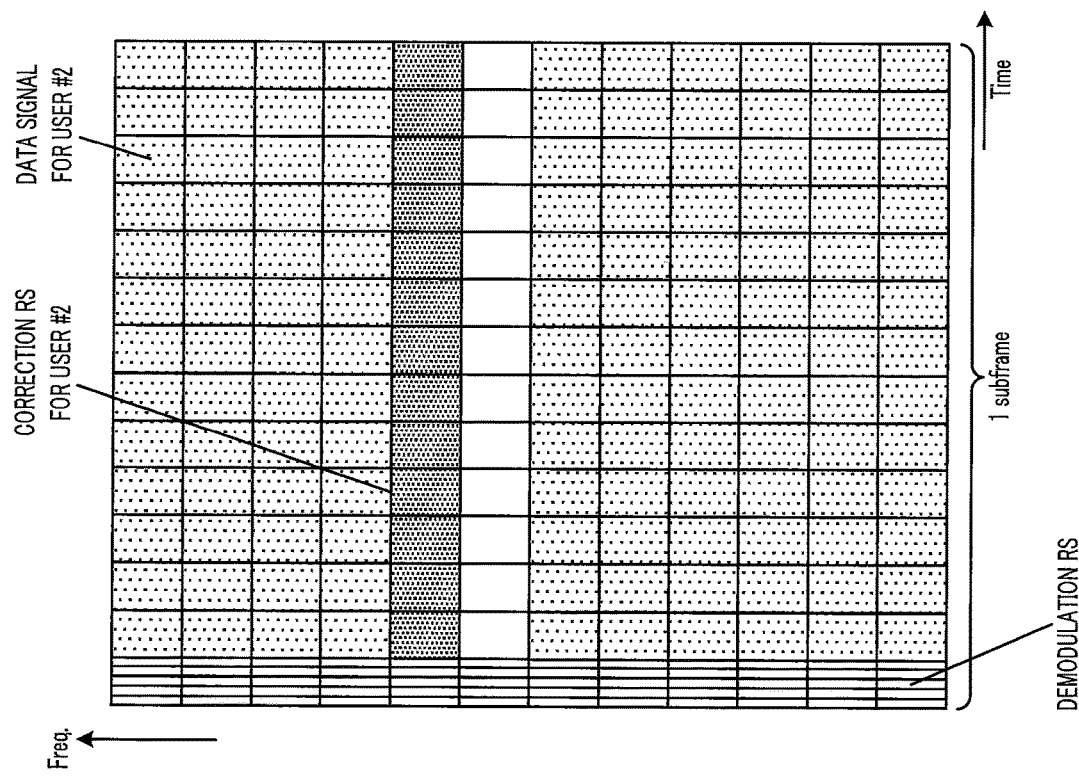
FIG. 27B is a diagram illustrating second example mapping according to variation 5 of an embodiment of the present invention.
Figure 27A:
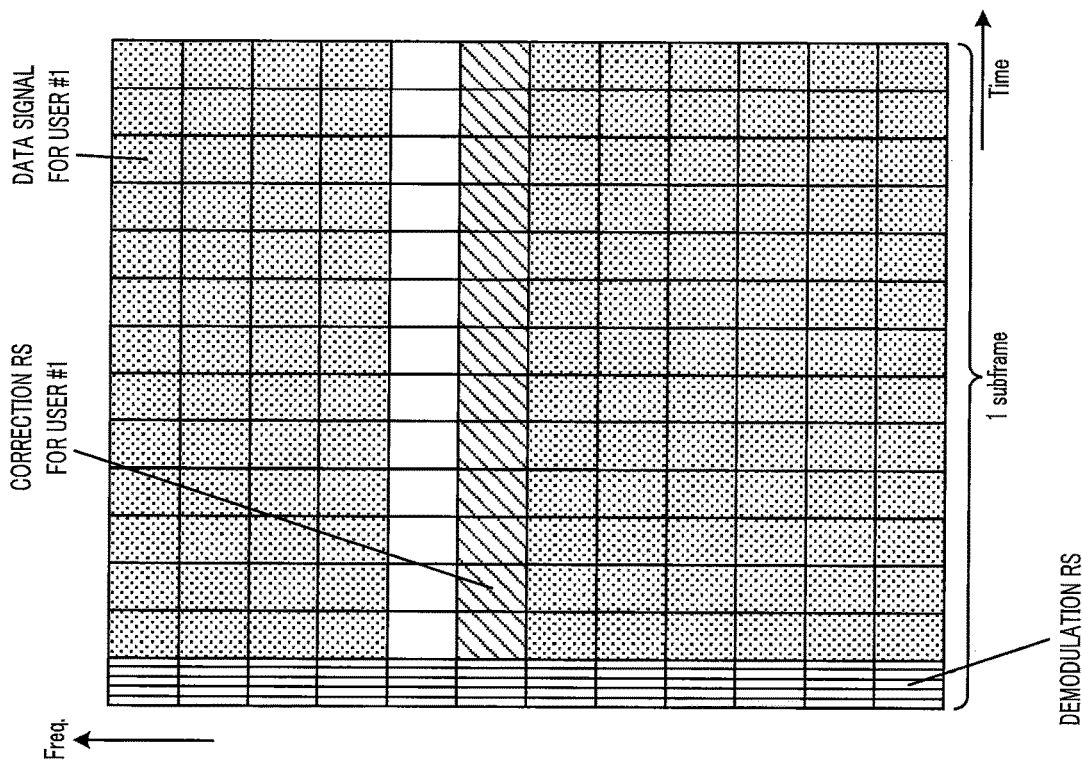
FIG. 27A is a diagram illustrating second example mapping according to variation 5 of an embodiment of the present invention.

FIGS. 27A and 27B are diagrams illustrating an example in which correction RSs for respective users are multiplexed by means of FDM. In FIG. 27A, a correction RS for user #1 is mapped to symbols SB 2 to SB 14 on SC 7. In FIG. 27B, a correction RS for user #2 is mapped to symbols SB 2 to SB 14 on SC 8. In this case, a DL data signal may be prevented from being mapped to REs on which a correction RS for another user is mapped (symbols SB 2 to SB 14 on SC 8 in FIG. 27A and symbols SB 2 to SB 14 on SC 7 in FIG. 27B). In this case, the DL data signal is subjected to puncturing or rate matching.

Variations 1 to 5 of the present embodiment have been described above.

Note that although in the above description, one RU is defined by 168 REs each constituted by 14 symbols and 12 subcarriers, in the present embodiment, there is no specific limitation on definition (the number of symbols and the number of subcarriers) of an RU.

Also, in the present embodiment, there is no specific limitation on a procedure for generating a sequence for a correction RS. For example, it is possible to generate a pseudo noise (PN) sequence with any of, or any combination of, physical cell identities (PCIDs), virtual cell identities (VCIDs), and user equipment cell identities (UE-IDs) as a sequence seed and generate a correction RS using the PN sequence. Alternatively, instead of a PN sequence, another sequence such as a Zadoff-Chu sequence may be used to generate a correction RS.

Figure 29:
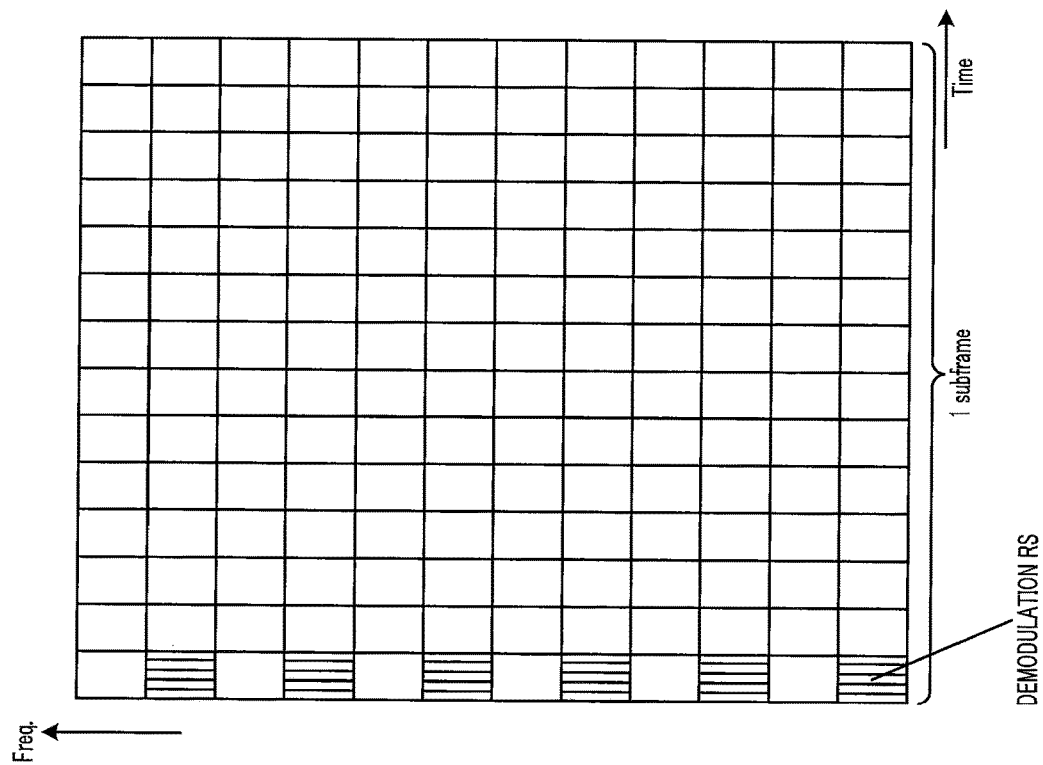
FIG. 29 is a diagram illustrating second example mapping of a demodulation RS in an embodiment of the present invention.
Figure 28:
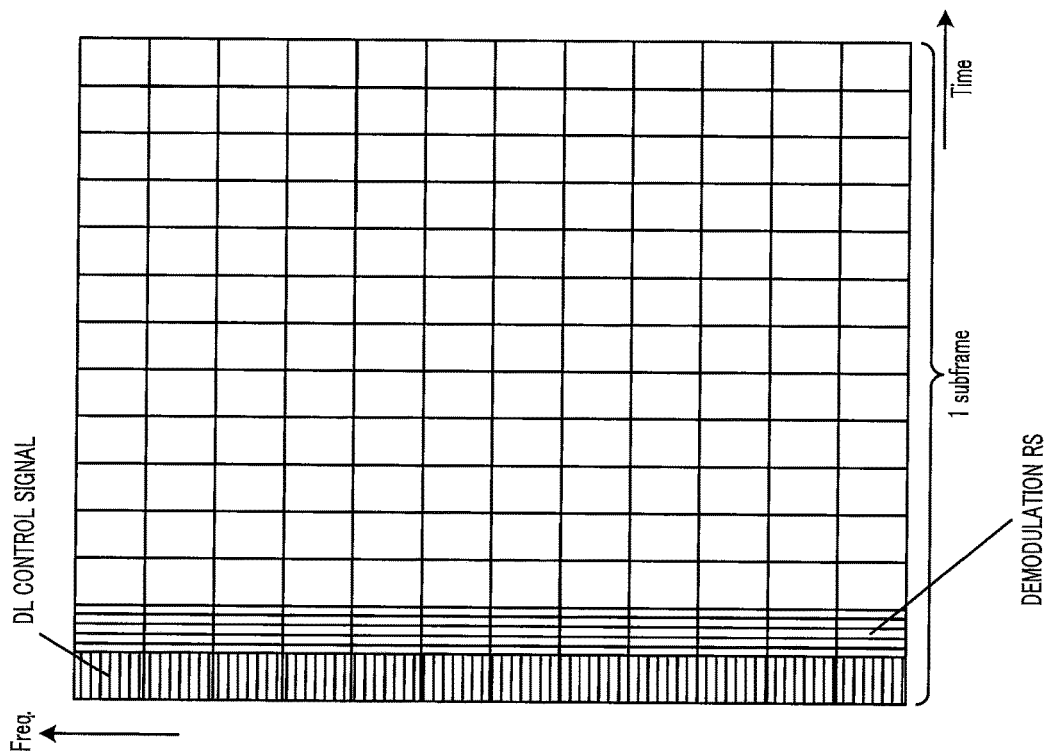
FIG. 28 is a diagram illustrating first example mapping of a demodulation RS in an embodiment of the present invention.

Also, although the above description indicates the case where a demodulation RS is mapped to a top symbol in each subcarrier in a RU as an example, the present embodiment is not limited to this example, a demodulation RS may be mapped to any of symbols on the front side (from the top symbol to a k-th symbol (k is an integer of no less than 2, for example, k=3)) of a RU. In this case, a correction RS is mapped to a symbol on the rear side relative to the symbol to which the demodulation RS is mapped. For example, as illustrated in FIG. 28, radio base station 10 may map a DL control signal to a top symbol in each subcarrier and map a demodulation RS on a second symbol in each subcarrier. Also, as illustrated in FIG. 29, radio base station 10 may map a demodulation RS to a top symbol on some of subcarriers (SC 1, SC 3, SC 5, SC 7, SC 9, SC 11).

Also, in the present embodiment, each user terminal 20 may report a temporal fluctuation amount calculated using a correction RS to radio base station 10. There is no specific limitation on a method of reporting the temporal fluctuation amount, and for example, the temporal fluctuation amount may be included in uplink control information or physical uplink control channel (PUCCH). Note that each user terminal 20 calculates the temporal fluctuation amount of each symbol for each of antenna ports (layers) or by, for example, performing averaging processing of these values, and generates report information indicating the temporal fluctuation amounts.

Also, there is no specific limitation on a timing of reporting a temporal fluctuation amount, and each user terminal 20 may collectively report the temporal fluctuation amounts for all of the antenna ports or the temporal fluctuation amount obtained by, for example, averaging processing of these values to radio base station 10 or may report the temporal fluctuation amounts for respective antenna ports, individually as appropriate. In the case of reporting as appropriate, radio base station 10 may select an antenna port that is subject to reporting and a cycle of reporting and indicate them to each user terminal 20, each user terminal 20 may make such selection, or such selection may be previously defined in advance between radio base station 10 and each user terminal 20.

The respective embodiments of the present invention have been described above.

(Hardware Configuration)

Note that the block diagrams used to describe the embodiments illustrate blocks on the basis of functions. These functional blocks (constituent sections) are implemented by any combination of hardware and/or software. A means for realizing the functional blocks is not particularly limited. That is, the functional blocks may be implemented by one physically and/or logically coupled apparatus. Two or more physically and/or logically separated apparatuses may be directly and/or indirectly (for example, wired and/or wirelessly) connected, and the plurality of apparatuses may implement the functional blocks.

Figure 30:
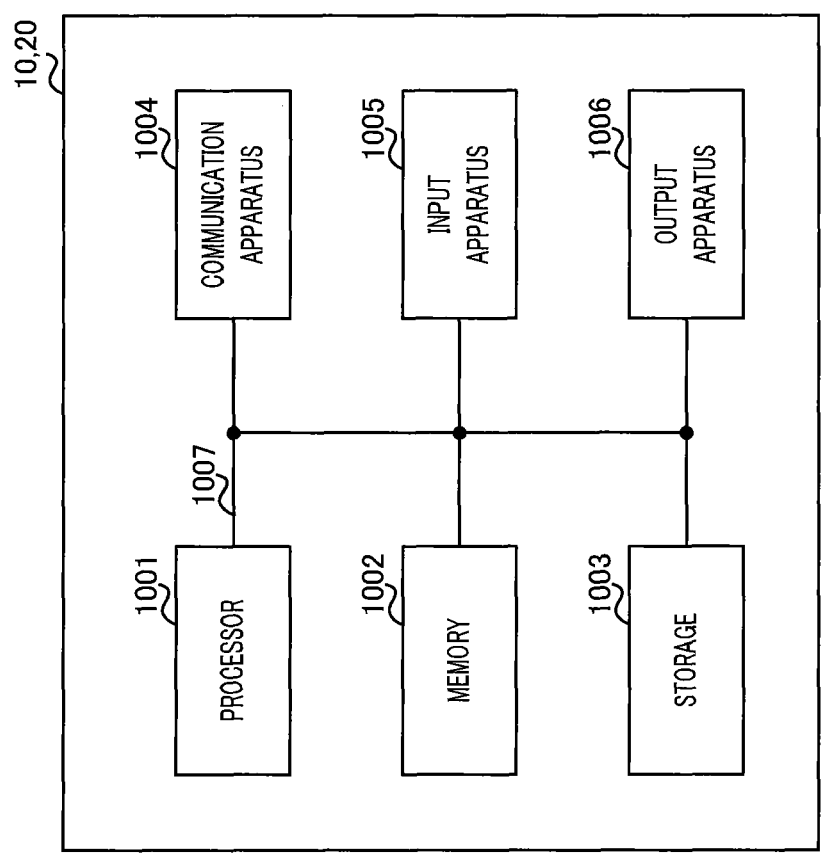
FIG. 30 is a diagram illustrating an example of hardware configurations of a radio base station and a user terminal according to the present invention.

For example, the radio base station, the user terminal, and/or the like, according to an embodiment of the present invention may function as computers which perform processing of the radio communication method of the present invention. FIG. 30 illustrates an example of hardware configurations of the radio base station and the user terminal according to an embodiment of the present invention. The above-described radio base station 10 and user terminal 20 may be physically configured as a computer apparatus including processor 1001, memory 1002, storage 1003, communication apparatus 1004, input apparatus 1005, output apparatus 1006, bus 1007, and/or the like.

Note that the term "apparatus" in the following description can be replaced with a circuit, a device, a unit, and/or the like. The hardware configurations of radio base station 10 and user terminal 20 may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and/or the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and/or the like. For example, controller 101, transmission signal generator 102, precoding processor 103, mapper 104, IFFT processor 105, FFT processor 203, signal separator 204, channel estimator 205, channel corrector 206, and demodulator and decoder 207 described above may be implemented by processor 1001.

Processor 1001 reads out a program (program code), a software module, or data from storage 1003 and/or communication apparatus 1004 to memory 1002 and executes various types of processing according to the read-out program and/or the like. The program used is a program for causing the computer to execute at least part of the operation described in the embodiments. For example, controller 101 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), and/or the like. Memory 1002 can save a program (program code), a software module, and/or the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmitter 106, antenna 107, antenna 201, receiver 202, and/or the like, as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented by at least one of these pieces of hardware.

(Variations of Present Invention)

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, and/or the like. The reference signal can also be abbreviated as RS and may also be called a pilot depending on the applied standard. The demodulation RS and the correction RS may be called by other corresponding names, respectively. The demodulation RS and the correction RS may be specified by the same name (for example, demodulation RS).

Also, the DL data signal may be called a physical downlink shared channel (PDSCH) or a downlink data channel. Also, the DL control signal may be called a physical downlink control channel (PDCCH) or a downlink control channel.

The radio frame may be constituted by one frame or a plurality frames in the time domain. The one frame or each of the plurality of frames may be called a subframe, a time unit, and/or the like in the time domain. The subframe may be further constituted by one slot or a plurality of slots in the time domain. The slot may be further constituted by one symbol or a plurality of symbols (orthogonal frequency division multiplexing (OFDM) symbol, single carrier-frequency division multiple access (SC-FDMA) symbol, and/or the like) in the time domain.

The radio frame, the subframe, the slot, and the symbol indicate time units in transmitting signals. The radio frame, the subframe, the slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, or one slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame described above is illustrative only, and the number of subframes included in the radio frame, the number of slots included in the subframe, the numbers of symbols and resource blocks included in the slot, and the number of subcarriers included in the resource block can be changed in various ways.

The indication of information is not limited to the aspects or embodiments described in the present specification, and the information may be notified by another method. For example, the indication of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, and/or the like.

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, and/or the like.

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or a user equipment (UE) or by some other appropriate terms.

Also, the radio base station in the present specification may be replaced with the user terminal. For example, each of the aspects/embodiments of the present invention may be applied to a configuration in which a communication between the radio base station and the user terminal is replaced with a (D2D: Device-to-Device) communication between a plurality of user terminals. In this case, a configuration in which user terminal 20 has the above-described functions of radio base station 10 may be employed. Also, the terms "uplink" or "downlink" may be replaced with "sidelink". For example, the uplink channel may be replaced with the sidelink channel.

Likewise, the user terminal in the present specification may be replaced with the radio base station. In this case, a configuration in which radio base station 10 has the above-described functions of user terminal 20 may be employed.

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

The information, the signals, and/or the like can be output from a higher layer (or a lower layer) to a lower layer (or a higher layer). The information, the signals, and/or the like may be input and output through a plurality of network nodes.

The input and output information and/or the like may be saved in a specific place (for example, memory) or may be managed by a management table. The input and output information and/or the like can be overwritten, updated, or additionally written. The output information and/or the like may be deleted. The input information and/or the like may be transmitted to another apparatus.

The determination may be made based on a value expressed by one bit (0 or 1), based on a Boolean value (true or false), or based on comparison with a numerical value (for example, comparison with a predetermined value).

As used in the present specification, the term "determining" may encompass a wide variety of actions. For example, "determining" may be regarded as "determining" judging, calculating, computing, processing, deriving, investigating, looking up (for example, looking up in a table, a database, or another data structure), ascertaining, and/or the like. Also, "determining" may be regarded as receiving (for example, receiving information), transmitting (for example, transmitting information), inputting, outputting, accessing (for example, accessing data in a memory) and/or the like. Also, "determining" may be regarded as resolving, selecting, choosing, establishing and/or the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," and/or the like.

When articles, such as "a," "an," and "the" in English, are added by translation in the entire disclosure, the articles include plural forms unless otherwise clearly indicated by the context.

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and/or the like.

The software, the instruction, and/or the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

The information, the signals, and/or the like described in the present specification may be expressed by using any of various different techniques. For example, data, instructions, commands, information, signals, bits, symbols, chips, and/or the like that may be mentioned throughout the entire description may be expressed by one or an arbitrary combination of voltage, current, electromagnetic waves, magnetic fields, magnetic particles, optical fields, and photons.

The terms "system" and "network" used in the present specification can be interchangeably used.

The information, the parameters, and/or the like described in the present specification may be expressed by absolute values, by values relative to predetermined values, or by other corresponding information. For example, radio resources may be indicated by indices.

The names used for the parameters are not limited in any respect. Furthermore, the numerical formulas and/or the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

The order in each of the processing procedures, the sequences, the flowcharts, and/or the like in each of the aspects/embodiments described in the present specification may be changed as long as such change causes no contradiction. For example, the method described in present specification presents various step elements in exemplary orders, but is not limited to the presented specific orders.

The aspects and embodiments described in the present specification may be independently used, may be used in combination, or may be switched and used along the execution. Furthermore, indication of predetermined information (for example, indication, "it is X") is not limited to explicit indication, and may be performed implicitly (for example, by not indicating the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2016-157948 filed on Aug. 10, 2016, and the entire content of Japanese Patent Application No. 2016-157948 is hereby incorporated by reference.

INDUSTRIAL APPLICABILITY

An aspect of the present invention is useful for a mobile communication system.

REFERENCE SIGNS LIST

10 Radio base station
20 User terminal
101 Controller
102 Transmission signal generator
103 Precoding processor
104 Mapper
105 IFFT processor
106 Transmitter
107, 201 Antenna
202 Receiver
203 FFT processor
204 Signal separator
205 Channel estimator
206 Channel corrector
207 Demodulator and decoder

The invention claimed is:

1. A terminal, comprising:
a receiver that receives a signal comprising a demodulation reference signal (DM-RS) and a correction reference signal (RS) mapped to resources of a physical downlink shared channel (PDSCH); and
a processor that identifies a resource element to which the correction RS is mapped based on information relating to the resource element,
wherein the information relating to the resource element is indicated by radio resource control (RRC) signaling.

2. The terminal according to claim 1, wherein:
the information relating to the resource element is individually configured for each terminal.

3. The terminal according to claim 1, wherein:
an antenna port of the correction reference signal is associated with a DM-RS antenna port.

4. A terminal, comprising:
a processor that maps a demodulation reference signal (DM RS) and a correction reference signal (RS) to resources of a physical uplink shared channel (PUSCH), based on information relating to a resource element to which the correction reference signal is mapped; and
a transmitter that transmits a signal of the PUSCH to which the DM-RS and the correction RS are mapped,
wherein the information relating to the resource element is indicated by radio resource control (RRC) signaling.

5. The terminal according to claim 4, wherein:
the information relating to the resource element is individually configured for each terminal.

6. The terminal according to claim 4, wherein:
an antenna port of the correction reference signal is associated with the DM-RS antenna port.

7. A radio communication method for a terminal, the method comprising:

mapping a demodulation reference signal (DM-RS) and a correction reference signal (RS) to a resource of a physical uplink shared channel (PUSCH), based on information relating to a resource element to which the correction reference signal is mapped; and
transmitting a signal of the PUSCH to which the DM-RS and the correction (RS) are mapped,
wherein the information relating to the resource is indicated by radio resource control (RRC) signaling.

* * * * *